(12) United States Patent
Patil

(10) Patent No.: US 11,265,668 B1
(45) Date of Patent: Mar. 1, 2022

(54) VIRTUAL AUDIO REPRODUCTION FOR ENCLOSED PHYSICAL SPACE

(71) Applicant: SONY CORPORATION, Tokyo (JP)

(72) Inventor: Sharanappagouda Patil, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/076,338

(22) Filed: Oct. 21, 2020

(51) Int. Cl.
    *H04R 5/02* (2006.01)
    *H04S 7/00* (2006.01)
    *G06N 20/00* (2019.01)

(52) U.S. Cl.
    CPC ............ *H04S 7/302* (2013.01); *G06N 20/00* (2019.01); *H04S 7/308* (2013.01); *H04S 2400/11* (2013.01); *H04S 2400/13* (2013.01); *H04S 2420/01* (2013.01)

(58) Field of Classification Search
    CPC ...... H04S 7/302; H04S 7/308; H04S 2400/11; H04S 2400/13; H04S 2420/01; G06N 20/00
    USPC .................................................. 381/300, 303
See application file for complete search history.

(56) References Cited

U.S. PATENT DOCUMENTS

| 7,096,169 | B2 | 8/2006 | Crutchfield, Jr. |
| 2003/0007648 | A1 | 1/2003 | Currell |
| 2016/0109284 | A1 | 4/2016 | Hammershoi et al. |
| 2021/0279957 | A1* | 9/2021 | Eder .................. G06Q 10/0875 |

* cited by examiner

*Primary Examiner* — Ammar T Hamid
(74) *Attorney, Agent, or Firm* — Chip Law Group

(57) ABSTRACT

An electronic apparatus and method for audio reproduction virtualization in an enclosed physical space. The electronic apparatus generates a 3D model of an enclosed physical space based on one or more images and applies a machine learning model on the 3D model, to determine a plurality of objects and one or more acoustic parameters of the plurality of objects. The electronic apparatus controls an audio capturing device to determine a first frequency response for a first sound in the enclosed physical space based on the determined one or more acoustic parameters. The electronic apparatus applies a plurality of combinations of operational modes, and 3D positions of the first audio reproduction device on the 3D model and the first frequency response to generate a second frequency response. The electronic apparatus selects first combination based on the second frequency response and displays output information associated with the selected first combination.

22 Claims, 12 Drawing Sheets

VIRTUAL AUDIO REPRODUCTION FOR ENCLOSED PHYSICAL SPACE

CROSS-REFERENCE TO RELATED APPLICATIONS/INCORPORATION BY REFERENCE

None.

FIELD

Various embodiments of the disclosure relate to audio reproduction. More specifically, various embodiments of the disclosure relate to an electronic apparatus and method for audio reproduction virtualization in an enclosed physical space.

BACKGROUND

Recent advancements in the field of imaging and audio reproduction, have led to development of various technologies and systems for three-dimensional (3D) scanning and audio reproduction devices. Typically, a plethora of audio reproduction devices of various types, shapes, and sizes may be available in the market for purchase. The audio reproduction devices may support different audio modes and may belong to different price ranges. The sheer number of options of the audio reproduction devices available to a user for purchase and various factors that may be associated with an enclosed physical space (such as, a room) where such audio reproduction devices may be intended to be placed, may complicate the purchase decision for the user. In certain solutions, an electronic device may enable the user to visualize a particular audio reproduction device in a simulated virtual environment associated with the enclosed physical space of the user, through a virtual reality or mixed reality device (such as, a head mounted display). However, the existing solutions may be unable to provide a realistic audio experience associated with an audio reproduction device for the enclosed physical space of the user, before the actual purchase and placement of the audio reproduction device in the enclosed physical space of the user.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for audio reproduction virtualization in an enclosed physical space is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
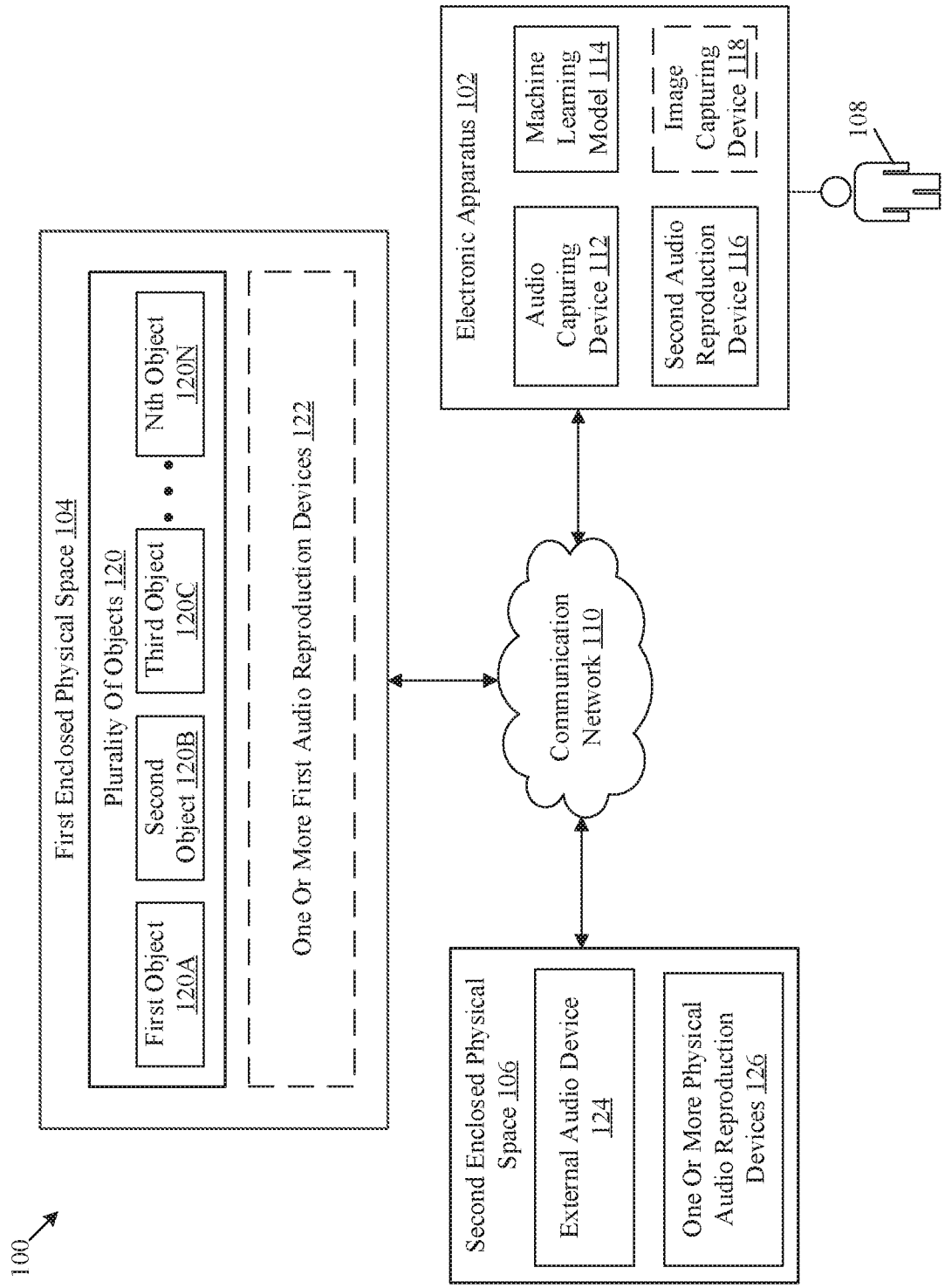
FIG. 1 is a block diagram that illustrates an exemplary network environment for control of an electronic apparatus for audio reproduction virtualization in an enclosed physical space, in accordance with an embodiment of the disclosure.

The following described implementations may be found in a disclosed electronic apparatus and method for audio reproduction virtualization in an enclosed physical space. Exemplary aspects of the disclosure provide an electronic apparatus (for example, a mobile phone, a head-mounted device, or a computing device) which may provide audio reproduction virtualization for one or more first audio reproduction devices (for example, a loudspeaker, a woofer, and the like) in an enclosed physical space (for example, a room, a hall, and the like). The one or more first audio reproduction devices may be virtually present in the enclosed physical space. The electronic apparatus may be communicatively coupled to an audio capturing device (e.g., a micro-phone) and a memory that may store a plurality of operational modes of the one or more first audio reproduction devices. Examples of the plurality of operational modes may include, but are not limited to, a volume setting, a gain setting, a filter setting, or an equalization setting, associated with the one or more first audio reproduction devices. The electronic apparatus may be configured to scan the enclosed physical space or capture one or more images of the enclosed physical space to generate a three-dimensional (3D) model of the enclosed physical space (for example, a virtual model of the enclosed physical space), based on the captured one or more images. The captured one or more images may include color information and depth information associated with the enclosed physical space, for the generation of the 3D model. This may allow the electronic apparatus to generate a simulated environment (for example, a virtual environment or a mixed-reality environment) in order to visualize the enclosed physical space.

The electronic apparatus may be further configured to apply a machine-learning (ML) model on the generated 3D model of the enclosed physical space, to determine a plurality of objects present in the enclosed physical space and one or more acoustic parameters of the plurality of objects.

In an embodiment, the plurality of objects may include, but are not limited to, at least one of a second audio reproduction device (for example another speaker present in real in the enclosed physical space), a display device, one or more furniture items, one or more decorative items, or one or more listeners present in the enclosed physical space. In an embodiment, the one or more acoustic parameters may include, but are not limited to, an absorption coefficient, a reflection coefficient, a dimension, or a volume associated with each of the determined plurality of objects. The electronic apparatus may further control the audio capturing device to determine a first frequency response (for example, an impulse response) for a first sound (for example, an ambient sound) present in the enclosed physical space. The determination of the first frequency response may be based on the determined one or more acoustic parameters of the determined plurality of objects present in the enclosed physical space. This may allow the electronic apparatus to generate an acoustic model of the enclosed physical space based on the first frequency response for the first sound present in the enclosed physical space. Based on the generated 3D model and the first frequency response of the enclosed physical space, the electronic apparatus may be configured to generate a second frequency response of the enclosed physical space for the one or more first audio reproduction devices (for example virtual speakers). The generation of the second frequency response may be used to dynamically provide audio reproduction virtualization in the enclosed physical space. For example, on the generated 3D model and on the first frequency response, the electronic apparatus may apply a plurality of combinations of the plurality of operational modes associated with the one or more first audio reproduction devices and one or more three-dimensional (3D) positions of the one or more first audio reproduction devices. In an embodiment, the one or more first audio reproduction devices may be virtual audio reproduction devices. The electronic apparatus may be further configured to select a first combination from the plurality of combinations based on the second frequency response generated for each of the plurality of combinations and further display output information associated with the selected first combination.

The disclosed electronic apparatus may provide audio reproduction virtualization in the enclosed physical space based on the plurality of operational modes associated with the one or more first audio reproduction devices (i.e. virtual speakers) and the generated 3D model of the enclosed physical space. This may enable a user present in the enclosed physical space to experience a virtual audio output associated with the one or more first audio reproduction devices and corresponding 3D positions in the enclosed physical space. The virtual audio output may be close to a realistic audio output of the one or more first audio reproduction devices, when physically placed and operated, in the enclosed physical space. The virtual audio output may be determined on the basis of the second frequency response (e.g., an acoustic model), that may be generated based on the plurality of operational modes of the one or more first audio reproduction devices, different 3D positions of the first audio reproduction devices, the 3D model of the enclosed physical space, and the one or more acoustic parameters of the plurality of objects present in the enclosed physical space. The disclosed electronic apparatus may determine the second frequency response (e.g., an acoustic model) for each of multiple combinations of the plurality of operational modes of the one or more first audio reproduction devices and the 3D positions of the one or more first audio reproduction devices in the enclosed physical space. Based on the second frequency response generated for each combination of the plurality of operational modes and 3D positions, the electronic apparatus may select the first combination (i.e. best combination) from the multiple combinations and display the output information about the selected first combination. For example, the selection of the first combination may be based on a comparison of the second frequency response of each combination with a target frequency response (that may be expected by the user). Thus, the electronic apparatus may select (based on the closest match of frequency responses) a best combination of one or more first audio reproduction devices, their corresponding operational modes, and 3D positions of the one or more first audio reproduction devices for the enclosed physical space and display the associated output information to the user. The output information may include model information about selected audio reproduction devices, and the operation modes and 3D positions of the selected audio reproduction devices in the enclosed physical space. Thus, based on the output information, the disclosed electronic enclosed physical space may enable the user to choose (and purchase, if required) the most appropriate audio reproduction device(s), configure them with suitable operational modes, and place them at 3D positions in the enclosed physical space that may lead to the best audio experience for the user. In an embodiment, the electronic apparatus may control the second audio reproduction device (i.e. real speaker in the enclosed physical space) or control an integrated audio reproduction device (such as headphone or internal speaker) to reproduce the real audio output for each of the generated second frequency response for the plurality of combinations, such that the user may have real audio experience for each second frequency response and select the best combination, without actually buying and placing the one or more first audio reproduction devices in the enclosed physical space (i.e. particular room related to the user). The virtualization of various audio reproduction devices (and their modes and 3D positions) in the enclosed physical space provided by the disclosed electronic apparatus, may save user's cost and time to actually purchase, deploy, and experience multiple audio reproduction devices available in the market.

FIG. 1 is a block diagram that illustrates an exemplary network environment for control of an electronic apparatus for audio reproduction virtualization in an enclosed physical space, in accordance with an embodiment of the disclosure. With reference to FIG. 1, there is shown a diagram of a network environment 100. The network environment 100 may include an electronic apparatus 102, a first enclosed physical space 104, a second enclosed physical space 106, and a communication network 110. The electronic apparatus 102 may further include an audio capturing device 112, a machine-learning (ML) model 114, a second audio reproduction device 116, and an image capturing device 118. The first enclosed physical space 104 may further include a plurality of objects 120 and one or more first audio reproduction devices 122. The plurality of objects 120 may include a first object 120A, a second object 120B, a third object 120C, . . . , and an $N^{th}$ object 120N, as shown in FIG. 1. The N number of objects shown in FIG. 1 is presented merely as an example. The plurality of objects 120 may include only two objects or more than N objects, without departure from the scope of the disclosure. The second enclosed physical space 106 may further include an external audio device 124, and one or more physical audio reproduction devices 126. In the network environment 100, there is further shown a user 108 who may be associated with or an owner of the electronic apparatus 102. In FIG. 1, the external audio device 124 and the electronic apparatus 102 are shown as separate devices; however, in some embodiments, the entire functionality of external audio device 124 may be included in the electronic apparatus 102, without a deviation from scope of the disclosure.

The electronic apparatus 102 may include suitable logic, circuitry, code, and/or interfaces that may be configured to provide audio reproduction virtualization in an enclosed physical space (such as, the first enclosed physical space 104). The electronic apparatus 102 may be configured to generate a three-dimensional (3D) model (for example a point cloud model) of the first enclosed physical space 104 based on one or more images of the first enclosed physical space 104 that may be captured by the image capturing device 118. The one or more images may include color information (for example RGB information) and depth information associated with the first enclosed physical space 104. The electronic apparatus 102 may apply the ML model 114 on the generated 3D model to detect the plurality of objects 120 present in the first enclosed physical space 104 and one or more acoustic parameters of the plurality of objects 120. The electronic apparatus 102 may be configured to control the audio capturing device 112 to determine a first frequency response for a first sound present in the first enclosed physical space 104 based on the one or more acoustic parameters of the plurality of objects 120 present in the first enclosed physical space 104. The electronic apparatus 102 may be further configured to generate a second frequency response of the first enclosed physical space 104 based on application of each of a plurality of combinations of a plurality of operational modes of the one or more first audio reproduction devices 122 and one or more three-dimensional positions of the one or more first audio reproduction devices 122, on the generated 3D model and on the determined first frequency response. Based on the second frequency responses for the plurality of combinations, the electronic apparatus 102 may select a first combination from the plurality of combinations. Examples of the electronic apparatus 102 may include, but are not limited to, a computing device, a smartphone, a cellular phone, a mobile phone, a personal digital assistant (PDA), a computer workstation, a gaming device, a tablet computing device, a laptop computer, an imaging device, a mainframe machine, and/or a consumer electronic (CE) device with imaging and audio processing capabilities.

The audio capturing device 112 may include suitable logic, circuitry, code and/or interfaces that may be configured to capture a sound (such as, the first sound) present in the first enclosed physical space 104. The captured sound may be further used for generation of a frequency response (such as, the first frequency response, e.g., an impulse response) of the captured first sound. Examples of the first sound present in the first enclosed physical space 104 may include, but are not limited to, an ambient sound present in the first enclosed physical space 104, a second sound produced by an audio reproduction device (i.e. real speaker) present in the first enclosed physical space 104, or a noise present in the first enclosed physical space 104. In an embodiment, the first frequency response of the first sound, captured by the audio capturing device 112, may be different for one or more dimensions of the first enclosed physical space 104 due to the one or more acoustic parameters. Examples of the one or more acoustic parameters may include, but are not limited to, an absorption coefficient, a reflection coefficient, a dimension, or a volume associated with each of the determined plurality of objects 120 in the first enclosed physical space 104. Examples of the audio capturing device 112 may include, but are not limited to, a recorder, an electret microphone, a dynamic microphone, a carbon microphone, a piezoelectric microphone, a fiber microphone, a micro-electro-mechanical-systems (MEMS) microphone, or other microphones. In some embodiments, the audio capturing device 112 may be positioned in the first enclosed physical space 104 to capture the first sound, and further communicate with the electronic apparatus 102, via the communication network 110.

The ML model 114 may be an object detector model, which may be trained on an object detection or classification task on one or more images of an enclosed physical space (such as, the first enclosed physical space 104). The ML model 114 may be pre-trained on a training dataset of different object types typically present in the first enclosed physical space 104. The ML model 114 may be defined by its hyper-parameters, for example, number of weights, cost function, input size, number of layers, and the like. The hyper-parameters of the ML model 114 may be tuned and weights may be updated before or while training the ML model 114 on a training data set so as to identify a relationship between inputs, such as features in a training dataset and output labels, such as different objects e.g., audio reproduction device, a display device, a furniture item, a decorative item, or a listener. After several epochs of the training on feature information in the training dataset, the ML model 114 may be trained to output a prediction/classification result for a set of inputs. The prediction result may be indicative of a class label (such as type of object) for each input of the set of inputs (e.g., input features extracted from new/unseen instances).

In an embodiment, the ML model 114 may include electronic data, such as, for example, a software component of an application executable on the electronic apparatus 102. The ML model 114 may rely on libraries, external scripts, or other logic/instructions for execution by a processing device, such as the electronic apparatus 102. The ML model 114 include computer-executable codes or routines to enable a computing device, such as the electronic apparatus 102, to perform one or more operations to determine the plurality of objects in one or more images, or a surface material of each of the determined plurality of objects. Additionally, or alternatively, the ML model 114 may be implemented using hardware including a processor, a microprocessor (e.g., to perform or control performance of one or more operations), a field-programmable gate array (FPGA), or an application-specific integrated circuit (ASIC). In some embodiments, the ML model 114 may be implemented using a combination of hardware and software. Examples of the ML model 114 may include, but is not limited to, a neural network model or a model based on one or more of regression method(s), instance-based method(s), regularization method(s), decision tree method(s), Bayesian method(s), clustering method(s), association rule learning, and dimensionality reduction method(s).

The second audio reproduction device 116 may include suitable logic, circuitry, and/or interfaces that may be configured to reproduce audio associated with audio content (for example, a song, a test tone, or a musical tone) that may be stored in a memory (shown in FIG. 2) associated with the electronic apparatus 102. The second audio reproduction device 116 may be configured to receive electrical signals or instructions (i.e. related to the audio content) from the electronic apparatus 102 and convert the received electrical signals or instructions into an audio output. The second audio reproduction device 116 may be configured to reproduce a second sound based on the second frequency response generated for each of the plurality of combinations. The second audio reproduction device 116 may be integrated with the electronic apparatus 102. In such case, the second audio reproduction device 116 may be an internal component of the electronic apparatus 102 and the entire functionality of second audio reproduction device 116 may be included in the electronic apparatus 102. In some embodiments, the second audio reproduction device 116 may be separate from the electronic apparatus 102 and may be communicatively coupled with electronic apparatus 102, through the communication network 110. Examples of the second audio reproduction device 116 may include, but are not limited to, an external wireless speaker, an internal speaker, a headphone, earphone, an external wired speaker, a woofer, a sub-woofer, a tweeter, a loudspeaker, a monitor speaker, an optical audio device, or sound output device.

The image capturing device 118 may include suitable logic, circuitry, code, and/or interfaces that may be configured to capture the one or more images of the first enclosed physical space 104. The one or more images may include the color information and the depth information associated with the first enclosed physical space 104. In an embodiment, the image capturing device 118 may be an internal component of the electronic apparatus 102 and the entire functionality of the image capturing device 118 may be included in the electronic apparatus 102. In some embodiments, the image capturing device 118 may be separate from the electronic apparatus 102, may be communicatively coupled with the electronic apparatus 102, and may be positioned within the first enclosed physical space 104 to capture the one or more images. In one embodiment, the image capturing device 118 may include one or more sensors, such as a combination of a depth sensor, a color sensor, (such as a red-green-blue (RGB) sensor), an infrared (IR) sensor, and/or multiple images simultaneous localization and mapping (SLAM) sensor that may capture one or more color images including the color information and the depth information of the first enclosed physical space 104. In another embodiment, the image capturing device 118 may be an active 3D scanner that may capture radiation or light to scan a 3D structure of the first enclosed physical space 104 and record the corresponding depth information and the color information. The depth information may indicate a distance between a position of the image capturing device 118 and different points on various surfaces of the first enclosed physical space 104 For example, the active 3D scanner may be a time-of-flight (TOF)-based 3D laser scanner, a laser range-finder, a TOF camera, a hand-held laser scanner, a structured light 3D scanner, a modulated light 3D scanner, an aerial Light Detection and Ranging (LiDAR) laser scanner, a 3D LiDAR, a 3D motion sensor, a 3D camera, and the like.

In the network environment 100, there is shown that the plurality of objects 120 and the one or more first audio reproduction devices 122, may be located within the first enclosed physical space 104. The first enclosed physical space 104 may be a three-dimensional physical area that may be surrounded by walls and a roof (or ceiling), and/or may have a defined physical dimension in a physical environment. The first enclosed physical space 104 may correspond to the physical environment for which the electronic apparatus 102 may provide audio experience (i.e. associated with the audio reproduction virtualization) to the user 108. Examples of the first enclosed physical space 104 may include, but are not limited to, a room, a hall, a theatre, or other enclosed areas. The plurality of objects 120 may include, but not limited to, a second audio reproduction device (e.g. another speaker physically present in the first enclosed physical space 104), a display device, one or more furniture items, one or more decorative items, or one or more listeners (such as the user 108) present in the first enclosed physical space 104.

The one or more first audio reproduction devices 122 may include suitable logic, circuitry, code, and/or interfaces that may be configured to reproduce virtual audio output associated with audio content (for example, a song, a test tone, or a musical tone) based on the plurality of operational modes associated with the one or more first audio reproduction devices 122. The one or more first audio reproduction devices 122 may correspond to virtual audio reproduction devices which may not be physically present in the first enclosed physical space 104. However, audio response of the virtual audio reproduction devices may be applied on the first frequency response (i.e. impulse response) of the first enclosed physical space 104 based on operational modes (i.e. audio modes) of the virtual audio reproduction devices, to further generate the second frequency response. Examples of the one or more first audio reproduction devices 122 may include, but are not limited to, an external wireless speaker, an internal speaker, an external wired speaker, a woofer, a sub-woofer, a tweeter, a loudspeaker, a monitor speaker, an optical audio device, or sound output device that may be communicatively coupled to the electronic apparatus 102 through the communication network 110 or integrated in the electronic apparatus 102.

In the network environment 100, there is shown that the external audio device 124 and the one or more physical audio reproduction devices 126, may be located within the second enclosed physical space 106. The second enclosed physical space 106 may be a three-dimensional physical area that may be surrounded by walls and a roof (or ceiling), and/or may have a defined physical dimension in a physical environment. The second enclosed physical space 106 may be different from the first enclosed physical space 104. The second enclosed physical space 106 may correspond to the physical environment that may include the one or more physical audio reproduction devices 126 to provide a real audio experience to the user 108. Examples of the second enclosed physical space 106 may include, but are not limited to, an electronics devices shop, an audio center, or other enclosed areas where the physical audio reproduction devices 126 may be present for purchase or to experience real audio output.

The external audio device 124 may include suitable logic, circuitry, code, and/or interfaces that may control audio reproduction for a physical audio reproduction device (for example, the one or more physical audio reproduction devices 126) in an enclosed physical space (such as, the second enclosed physical space 106). The one or more physical audio reproduction devices 126 may be similar to the one or more first audio reproduction devices 122 (i.e. audio reproduction devices). The external audio device 124 may receive the generated 3D model of the enclosed physical space (such as, the first enclosed physical space 104), the one or more acoustic parameters of the plurality of objects 120, the first frequency response of the first enclosed physical space 104, and the output information associated with the selected first combination, from the electronic apparatus 102. Based on the received 3D model, the one or more acoustic parameters, the first frequency response, and the output information, the external audio device 124 may transmit confirmation information, about the selection of the first combination from the plurality of combinations, to the electronic apparatus 102. The external audio device 124 may control the one or more physical audio reproduction devices 126, similar to the one or more first audio reproduction devices 122 indicated by the output information, to reproduce a third sound based on the received 3D model, the one or more acoustic parameters, the first frequency response, and the output information. The external audio device 124 may further control a second audio capturing device, associated with the external audio device 124, to generate a third frequency response for the third sound reproduced by the one or more physical audio reproduction devices 126. The external audio device 124 may compare the generated third frequency response with the second frequency response generated for the first combination; and may generate the confirmation information based on the comparison. In some embodiments, the external audio device 124 may be an internal component of the electronic apparatus 102 and the entire functionality of the external audio device 124 may be included in the electronic apparatus 102. In some embodiments, the external audio device 124 may be communicatively coupled with the electronic apparatus 102, may be positioned within the second enclosed physical space 106, and may provide the confirmation information, about the selection of the first combination from the plurality of combinations. Examples of the external audio device 124 may include, but are not limited to, a computing device, a smartphone, a cellular phone, a mobile phone, a personal digital assistant (PDA), a computer work-station, a tablet computing device, a laptop computer, a gaming device, a mainframe machine, and/or a consumer electronic (CE) device The one or more physical audio reproduction devices 126 may include suitable logic, circuitry, code, and/or interfaces that may be configured to reproduce the audio associated with audio content (for example, a song, a test tone, or a musical tone) The one or more physical audio reproduction devices 126 may be configured to receive electrical signals or instructions (i.e. related to the audio content) from the external audio device 124, and convert the received electrical signals or instructions into an audio output. In some embodiments, the one or more physical audio reproduction devices 126 may be communicatively coupled with the external audio device 124, and may be positioned within the second enclosed physical space 106. Examples of the one or more physical audio reproduction devices 126 may include, but are not limited to, an external wireless speaker, an internal speaker, an external wired speaker, a woofer, a sub-woofer, a tweeter, a loudspeaker, a monitor speaker, an optical audio device, or sound output device. In some embodiments, the one or more physical audio reproduction devices 126 may be similar (for example with same model or brand information) to the one or more first audio reproduction devices 122 indicated by the selected first combination. Details of the selection of the first combination from the plurality of combinations is described, for example, in FIGS. 3A-3C and 5.

The communication network 110 may include a communication medium through which the electronic apparatus 102, the audio capturing device 112, the image capturing device 118, one or more devices of the first enclosed physical space 104, and one or more devices (such as the one or more physical audio reproduction devices 126) of the second enclosed physical space 106 may communicate with each other. The communication network 110 may be one of a wired connection or a wireless connection. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic apparatus 102 may be configured to receive a user input from the user 108 to scan the first enclosed physical space 104 (for example a room). For example, the user 108 may provide the user input to experience audio output of the one or more first audio reproduction devices 122 (i.e. virtual speakers) which the user 108 may want to purchase. The electronic apparatus 102 may further control the image capturing device 118 (for example TOF sensor) to capture one or more images (including the depth information and the color information), of the first enclosed physical space 104. The depth information may include information indicative of a distance of each of the plurality of objects 120 (i.e. present in the first enclosed physical space 104 from the image capturing device 118. In other words, the depth information may indicate a distance between points (sampled points) on a surface associated with the first enclosed physical space 104 and an image-plane of the image capturing device 118. Similarly, the color information may include information related to color, texture, lighting (or albedo) of points sampled on the surface associated with the first enclosed physical space 104. The image capturing device 118 may further transmit the captured one or more images to the electronic apparatus 102.

The electronic apparatus 102 may be configured to generate a three-dimensional (3D) model or a point cloud model of an enclosed physical space (such as, the first enclosed physical space 104) based on the one or more images of the first enclosed physical space 104. The generated 3D model of the first enclosed physical space 104 may correspond to a 3D graphical model that may resemble an actual shape of the first enclosed physical space 104. Typically, the generated 3D model of the first enclosed physical space 104 may be rendered from a 3D mesh that may use polygonal surfaces to define a shape and geometry of the first enclosed physical space 104. The 3D model of the first enclosed physical space 104 may realistically represent surface features of the first enclosed physical space 104. In some exemplary scenarios, the 3D model may be further rendered in a Virtual Reality (VR) or Augmented Reality (AR) environment to represent the first enclosed physical space 104.

The electronic apparatus 102 may be configured to apply a machine-learning model (such as, the ML model 114) on the generated 3D model of the enclosed physical space (such as, the first enclosed physical space 104), to determine a plurality of objects 120 present in the first enclosed physical space 104 and one or more acoustic parameters of the plurality of objects 120. Details of the plurality of objects 120 and the one or more acoustic parameters are described, for example, in FIGS. 3A-3B. The one or more acoustic parameters of the plurality of objects 120 may be determined based on a surface material of the plurality of objects 120, which may be determined based on an application of the ML model 114 on the generated 3D model of the first enclosed physical space 104. For example, the electronic apparatus 102 may store an association between acoustic parameters (e.g., absorption coefficients and reflection coefficients) and surface materials of objects in the memory (e.g., a memory 204 of FIG. 2) of the electronic apparatus 102, and may determine the one or more acoustic parameters based on the stored association and the determined surface material of the plurality of objects 120. Example of the one or more acoustic parameters may include, but are not limited to, an absorption coefficient, a reflection coefficient, a dimension, a volume, associated with each of the determined plurality of objects 120. In some embodiments, the dimension or the volume of the each of the determined plurality of objects 120 may be determined from the one or captured images or determined based on the application of the ML model 114 on the generated 3D model of the first enclosed physical space 104.

The electronic apparatus 102 may be configured to control the audio capturing device 112 to determine a first frequency response for a first sound present in the first enclosed physical space 104 based on the determined one or more acoustic parameters of the determined plurality of objects 120 present in the first enclosed physical space 104. The electronic apparatus 102 may be further configured to apply, on the generated 3D model of the first enclosed physical space 104 and on the determined first frequency response, a plurality of combinations of the plurality of operational modes associated with the one or more first audio reproduction devices 122, and one or more three-dimensional (3D) positions of the one or more first audio reproduction devices 122, as described, for example, in FIGS. 3A and 3B.

Figure 2:
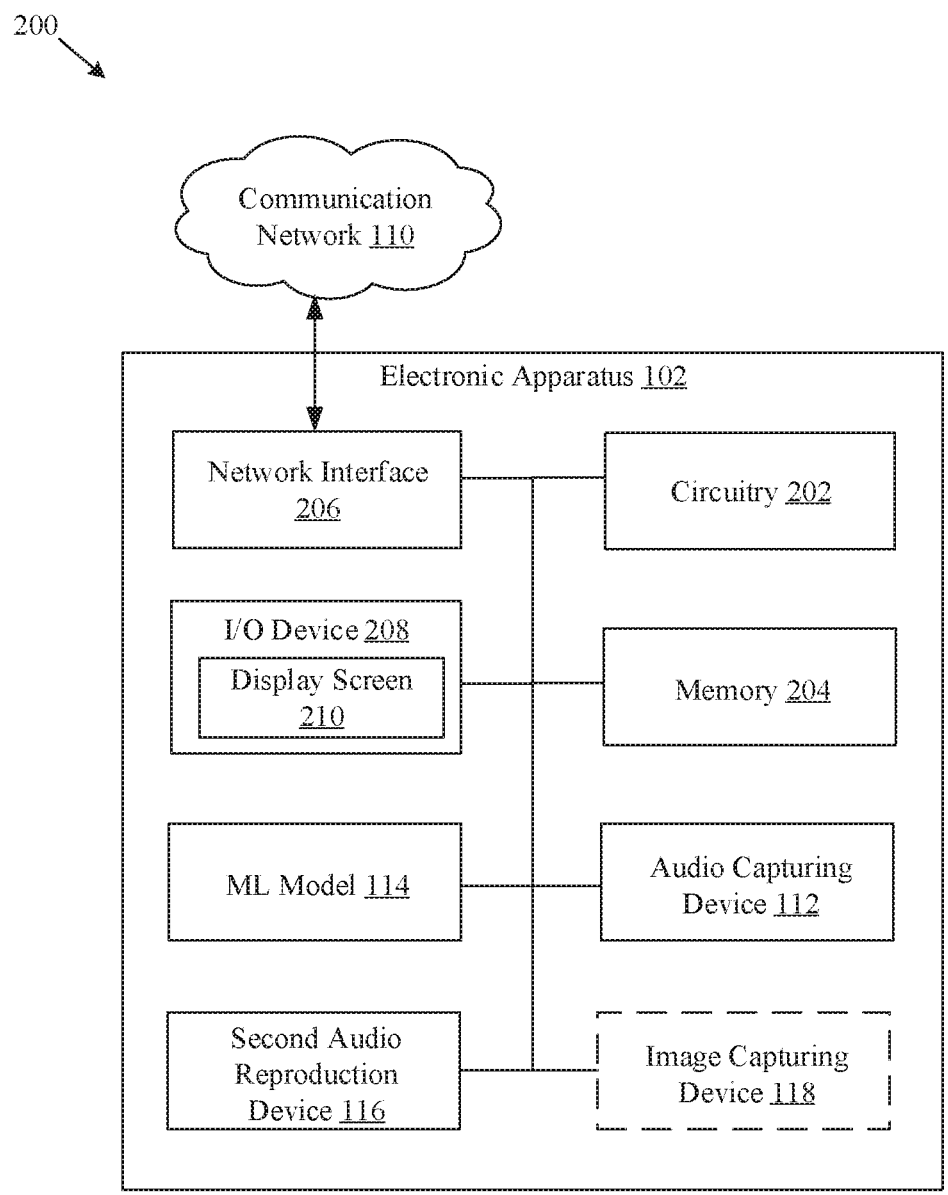
FIG. 2 is a block diagram that illustrates an exemplary electronic apparatus of FIG. 1, in accordance with an embodiment of the disclosure.
Figure 3A:
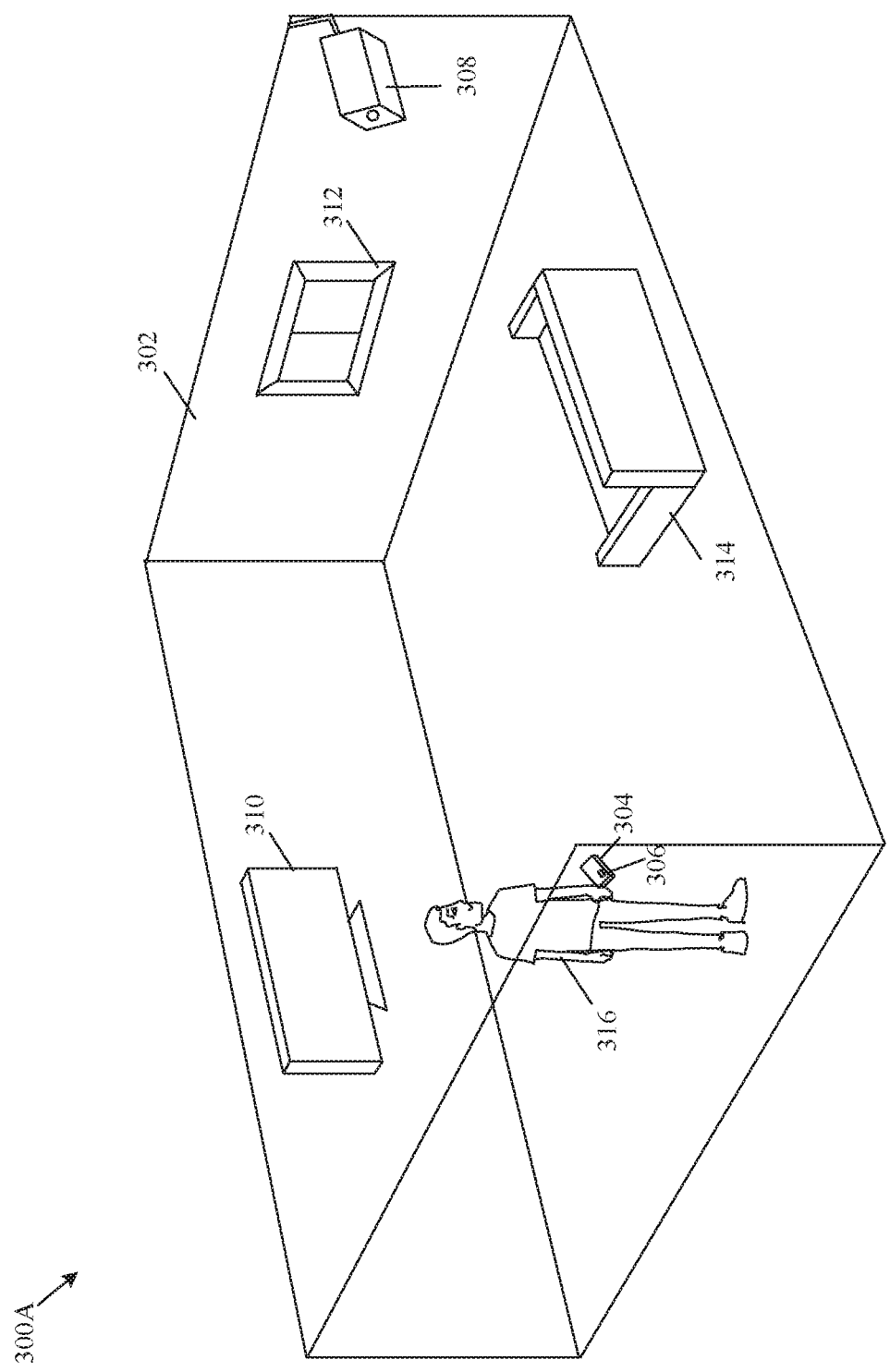
FIGS. 3A, 3B, 3C, and 3D are diagrams that illustrate exemplary scenarios for control of the electronic apparatus of FIG. 2, for audio reproduction virtualization in an enclosed physical space, in accordance with an embodiment of the disclosure.
Figure 3B:
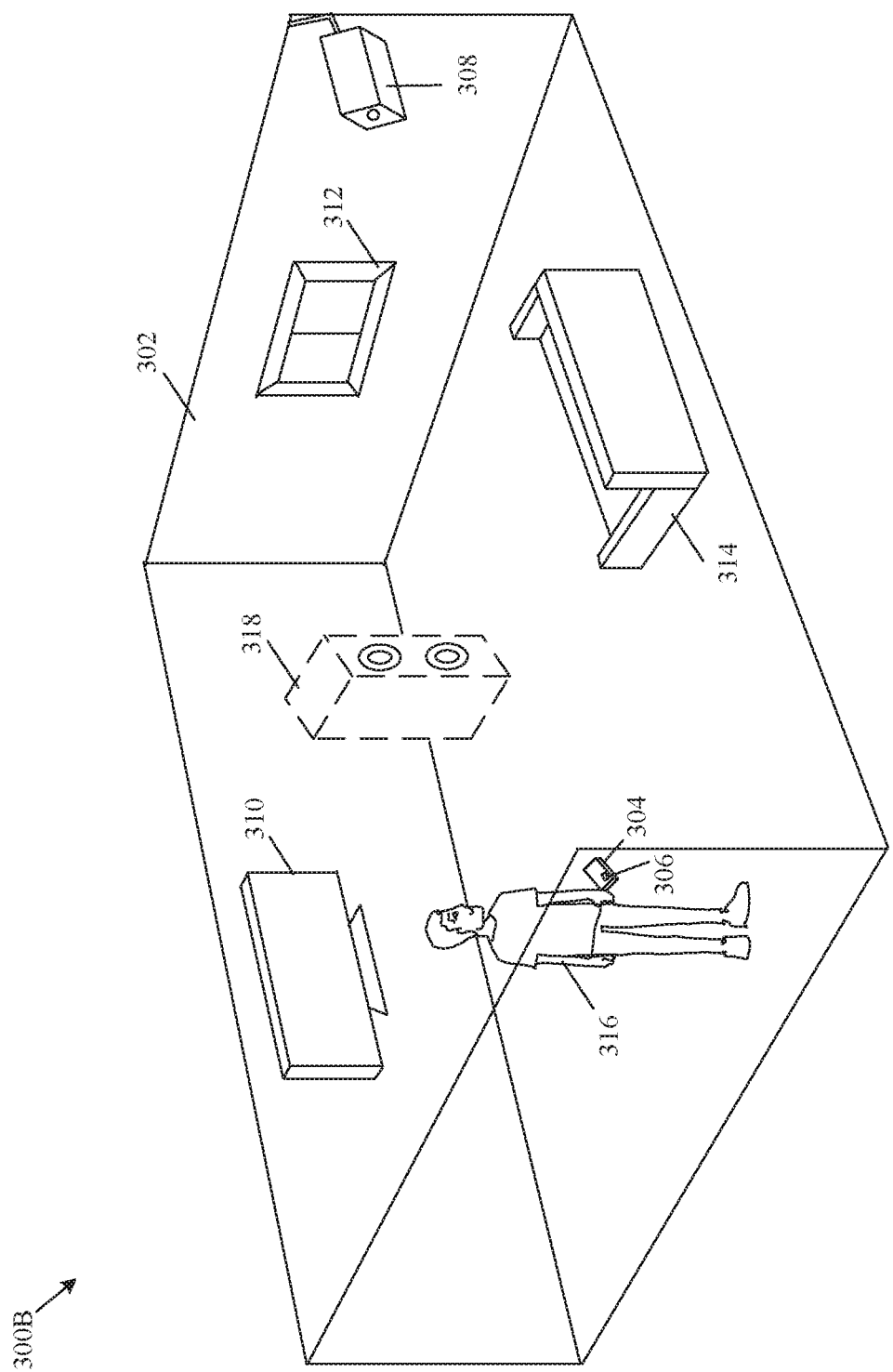

The electronic apparatus 102 may be configured to generate a second frequency response of the first enclosed physical space 104 based on the application of each of the plurality of combinations and the one or more 3D positions, on the generated 3D model and on the determined first frequency response, as described, for example, in FIG. 3B. The electronic apparatus 102 may be configured to select a first combination from the plurality of combinations based on the second frequency response generated for each of the plurality of combinations. For example, the selection of the first combination may be based on a comparison of the second frequency response of each combination with a target frequency response (that may be expected by the user 108). The electronic apparatus 102 may select a combination (as the first combination) with the closest match of the second frequency response with the target frequency response. The selected combination may indicate at least one of the one or more first audio reproduction devices 122, corresponding operational modes, and corresponding 3D positions in the first enclosed physical space 104, which may provide expected or best audio experience as per preference of the user 108. Further, the electronic apparatus 102 may control a display screen (shown in FIG. 2) to display the output information associated with the selected first combination, as described, for example, in FIGS. 3A, 3B and 5. Examples of the output information may include, but are not limited to, model information of one or more selected audio reproduction devices (i.e. selected virtual speaker similar to at least one of the one or more physical audio reproduction devices 126), one or more selected 3D positions of the one or more selected audio reproduction devices, and one or more operational modes of the one or more selected audio reproduction devices.

The disclosed electronic apparatus 102 may provide audio reproduction virtualization in the first enclosed physical space 104 based on the plurality of operational modes associated with the one or more first audio reproduction devices 122 and the generated 3D model of the first enclosed physical space 104. This may enable the user 108 present in the first enclosed physical space 104 to experience a virtual audio output associated with the one or more first audio reproduction devices 122 and corresponding 3D positions in the enclosed physical space. The virtual audio output may be close to a realistic audio output of the one or more first audio reproduction devices 122, when physically placed and operated, in the first enclosed physical space 104. The virtual audio output may be determined on the basis of the second frequency response, which may be determined based on the plurality of operational modes, different 3D positions of the one or more first audio reproduction devices 122, the 3D model of the first enclosed physical space 104, and the one or more acoustic parameters of the plurality of objects 120 present in the first enclosed physical space 104. The electronic apparatus 102 may determine the second frequency response for each of plurality of combinations of the plurality of operational modes (i.e. audio modes) of the one or more first audio reproduction devices 122 and the 3D positions of the one or more first audio reproduction devices 122 in the first enclosed physical space 104. Based on the second frequency response for each combination of the plurality of operational modes and 3D positions, the electronic apparatus 102 may select the first combination from the plurality of combinations and display the output information associated with the selected first combination. For example, the selection of the first combination may be based on a comparison of the second frequency response of each combination with a target frequency response (that may be expected by the user 108). Thus, the electronic apparatus 102 may select (i.e. based on the closest match of the second frequency response of the plurality of combinations with the target frequency response) a best combination of the one or more first audio reproduction devices 122, corresponding operational modes, and 3D positions of the one or more first audio reproduction devices 122 for the first enclosed physical space 104 and further control the display screen (shown in FIG. 2) to display the associated output information (indicating the selected best combination) to the user 108. This may enable the user 108 to choose the most appropriate audio reproduction device(s), their suitable operational modes, and their respective 3D positions in the first enclosed physical space 104 that may lead to the best audio experience for the user 108, before actual purchase and deployment of different audio reproduction devices.

FIG. 2 is a block diagram that illustrates an exemplary electronic apparatus of FIG. 1, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, a network interface 206, an input/output (I/O) device 208, the audio capturing device 112, the ML model 114, the second audio reproduction device 116, and the image capturing device 118. Further, the input/output (I/O) device 208 that may include a display screen 210. The electronic apparatus 102 may be connected to the communication network 110, through the network interface 206.

The circuitry 202 may include suitable logic, circuitry, interfaces, and/or code that may be configured to execute program instructions associated with different operations to be executed by the electronic apparatus 102. For example, some of the operations may include generation of a 3D model of an enclosed physical space (such as, the first enclosed physical space 104), determination of a plurality of objects (such as, the plurality of objects 120) present in the first enclosed physical space 104, control of the audio capturing device (such as the, audio capturing device 112), application of the plurality of combinations, generation of a second frequency response of the first enclosed physical space 104, selection a first combination from the plurality of combinations, and display of the output information associated with the selected first combination. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store the plurality of operational modes associated with one or more first audio reproduction devices 122 (i.e. virtual speakers). The memory 204 may be further configured to store the generated 3D model of the first enclosed physical space 104 and the one or more acoustic parameters of the plurality of objects 120. The memory 204 may be further configured to store a plurality of combinations of the plurality of operational modes associated with the one or more first audio reproduction devices 122, and the one or more three-dimensional (3D) positions of the one or more first audio reproduction devices 122. The memory 204 may store 3D listening positions of the user 108 present in the first enclosed physical space 104. The memory 204 may store the plurality of combinations of the plurality of operational modes associated with the one or more first audio reproduction devices 122, and the one or more three-dimensional (3D) positions of the one or more first audio reproduction devices 122 as a look-up table (for example Table 1 described with FIG. 3A). Further, the memory 204 may store an association between the one or more acoustic parameters (e.g., reflection coefficients and absorption coefficients) and surface materials of different types of objects that may be present in the first enclosed physical space 104, as a look-up table. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may comprise suitable logic, circuitry, interfaces, and/or code that may be configured to receive an input and provide an output based on the received input. The I/O device 208 may include various input and output devices, which may be configured to communicate with the circuitry 202. For example, the electronic apparatus 102 may receive a user input to select the plurality of operational modes associated with the one or more first audio reproduction devices 122, or the one or more three-dimensional (3D) positions of the one or more first audio reproduction devices 122, via one or more input devices of the I/O device 208.

Further, the electronic apparatus 102 may display the output information to the user 108, via one or more output devices (such as the display screen 210) of the I/O device 208. Examples of the I/O device 208 may include, but are not limited to, a touch screen, a keyboard, a mouse, a joystick, a display device (for example, the display screen 210), a microphone, or a speaker.

The display screen 210 may comprise suitable logic, circuitry, code, and/or interfaces that may be configured to display an output of the electronic apparatus 102. The display screen 210 may be utilized to display the output information. For example, the output information may include information associated with the selected first combination such as, but not limited to, model information of one or more selected audio reproduction devices, one or more selected 3D positions of the one or more selected audio reproduction devices, and one or more operational modes of the one or more selected audio reproduction devices. In some embodiments, the display screen 210 may be an external display device associated with the electronic apparatus 102. The display screen 210 may be a touch screen which may enable the user 108 to provide a user-input, via the display screen 210, in order to select the one or more first audio reproduction devices 122, the one or more 3D positions of the one or more selected audio reproduction devices, and the one or more operational modes of the one or more selected audio reproduction devices. In some embodiments, the display screen 210 may enable the user 108 to provide a 3D listening position of a listener (such as the user 108) in the generated 3D model of the first enclosed physical space 104. The touch screen may be at least one of a resistive touch screen, a capacitive touch screen, a thermal touch screen or any other touch screen using which inputs can be provided to the display screen 210 or the circuitry 202. The display screen 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 210 may refer to a display screen of a head mounted device (HMD), a smart-glass device, a see-through display, a projection-based display, an electro-chromic display, or a transparent display.

The network interface 206 may comprise suitable logic, circuitry, interfaces, and/or code that may be configured to facilitate communication between the electronic apparatus 102, the audio capturing device 112 (in case located externally from the electronic apparatus 102), the image capturing device 118 (in case located externally from the electronic apparatus 102), one or more devices of the first enclosed physical space 104, the external audio device 124, and the one or more physical audio reproduction devices 126 in the second enclosed physical space 106, via the communication network 110. The network interface 206 may be implemented by use of various known technologies to support wired or wireless communication of the electronic apparatus 102 with the communication network 110. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the electronic apparatus 102 in FIG. 2 may also include other suitable components or systems, in addition to the components or systems which are illustrated herein to describe and explain the function and operation of the present disclosure. A detailed description for the other components or systems of the electronic apparatus 102 has been omitted from the disclosure for the sake of brevity. The operations of the circuitry 202 are further described, for example, in FIGS. 3A-3D.

FIGS. 3A, 3B, 3C, and 3D are diagrams that illustrate exemplary scenarios for control of the electronic apparatus of FIG. 2, for audio reproduction virtualization in an enclosed physical space, in accordance with an embodiment of the disclosure. FIGS. 3A, 3B, 3C and 3D are explained in conjunction with elements from FIGS. 1 and 2. With reference to FIG. 3A, there is shown an exemplary scenario 300A. In the exemplary scenario 300A, there is shown a room 302 as an exemplary implementation of the first enclosed physical space 104 of FIG. 1. There is further shown an electronic apparatus 304, as an exemplary implementation of the electronic apparatus 102 of FIG. 1. There is further shown an audio capturing device 306, as an exemplary implementation of the audio capturing device 112 of FIG. 1. There is further shown an image capturing device 308, as an exemplary implementation of the image capturing device 118 of FIG. 1. The descriptions of the room 302, the electronic apparatus 304, the audio capturing device 306, and the image capturing device 308 are omitted from the disclosure for the sake of brevity. In some embodiments, the image capturing device 118 may be integrated in the electronic apparatus 102, such as an inbuilt camera device. There is further shown a display device 310 (such as Television (TV)), a window 312, and a sofa 314, which may be a plurality of objects (such as, the plurality of objects 120 of FIG. 1) present in the room 302. In the scenario 300A, there is further shown a listener 316 (such as the user 108 in FIG. 1). It may be noted that the display device 310 (i.e. TV), the window 312, and the sofa 314, shown as the plurality objects 120 in FIG. 3A, is merely an example. The scenario 300A may include other types of the plurality of objects 120 such as, but not limited to, a chair, a table, a decorative item, other electrical/electronic item, or utility items, without deviation from the scope of the disclosure.

In an embodiment, the electronic apparatus 304 may be configured to receive one or more images of the room 302 from a data source. The data source may be, for example, an inbuilt image sensor of the electronic apparatus 304, a persistent storage (such as the memory 204) on the electronic apparatus 304, an image capturing device (such as, the image capturing device 308), a cloud server, or a combination thereof. The one or more images may include color information (i.e. RGB information) and depth information of the room 302. The one or more images may include the plurality of objects 120, for example, the display device 310 (such as, the TV), one or more furniture items (such as, the window 312, and the sofa 314), one or more decorative items, or one or more listeners (such as, the listener 316) present in the room 302. The image capturing device 308 may be further configured to include the color information and the depth information associated with the room 302 in the captured one or more images. As an example, the image capturing device 308 may be a 3D imaging camera that may include an image sensor to acquire the color information (e.g., a color image in high-resolution) of the room 302, and a depth sensor to acquire the depth information (e.g., a depth map) of the room 302.

As another example, the image capturing device 308 may be a time-of-flight (TOF)-based 3D laser scanner that may emit one or more light beams in the room 302 to scan a 3D-structure of the room 302. The image capturing device 308 may receive one or more reflected light beams and record the depth information (e.g., a depth map) indicating a distance of the image capturing device 308 from each of the plurality of objects 120 (or from different points on the surfaces of the room 302), based on a time delay between the emission and receipt of the one or more light beams. In another example, the image capturing device 308 may be a ToF sensor that may emit one or more light beams of known intensity and phase to scan a 3D-structure of the room 302. The image capturing device 308 may receive one or more reflected light beams and record the depth information indicating a distance of the image capturing device 308 from each of the plurality of objects 120 (or from different points on the surfaces of the room 302), based on a difference of the intensities and/or phases between one or more emitted light beams and the one or more received light beams. In case, the image capturing device 308 is integrated in the electronic apparatus 304, then the depth information may indicate the distance of the electronic apparatus 304 from each of the plurality of objects 120 (or from different points on the surfaces of the room 302). In some embodiments, the one or more images may be captured from multiple positions in the room 302 to generate the 3D model of the room 302, such that all of the plurality of objects 120 may be captured from multiple positions in the room 302 effectively, and included in the generated 3D model of the room 302. In an embodiment, to capture one or more images from the image capturing device 308 integrated in the electronic apparatus 304, the electronic apparatus 304 may be held by the listener 316, as shown in FIGS. 3A-4A.

The electronic apparatus 304 may be further configured to receive the captured one or more images, or the color information and the depth information from the image capturing device 308. The electronic apparatus 304 may further classify material of each of the plurality of objects 120 into a reflective material or a non-reflective material, based on an intensity of each of the one or more received light beams. For example, if intensities of the one or more received light beams is less than intensities of the one or more emitted light beams, the electronic apparatus 304 may classify the material of the identified object as a non-reflective or an absorptive material. Examples of non-reflective materials may include, but are not limited to, foam, leather, or fabric. In an example, if intensities of the one or more received light beams are same or similar to intensities of the one or more emitted light beams, the electronic apparatus 304 may classify the material of the identified object as a reflective material. Examples of reflective materials may include, but are not limited to, wood, concrete, or glass. In an example, for a small enclosed physical space (such as, a living room), the ToF sensor may be used to scan the 3D-structure of the first enclosed physical space 104 (such as the room 302). In another example, for a large enclosed physical space (such as, a concert hall, or a theater), a structured light sensor may be used to scan the 3D-structure of the large enclosed physical space. The structured light sensor may have the capability and range to measure long distances.

The electronic apparatus 304 may be further configured to generate the 3D model (or point cloud model) of the room 302 based on the color information and the depth information in the one or more images of the room 302. The 3D model of the room 302 may represent a 3D layout or 3D room map of the room 302. The 3D layout of the room 302 may correspond to, but is not limited to, dimensions of the room 302, 3D positions of the plurality of objects 120 in the room 302 or the dimension of the plurality of objects 120 in the room 302. For example, the electronic apparatus 304 may apply the ML model 114 on the color information, the electronic apparatus 304 may identify one or more walls, a roof of the room 302, and the plurality of objects 120. Further, based on the depth information, the electronic apparatus 304 may determine a distance of each of the one or more walls the roof, and the plurality of objects 120 from the electronic apparatus 304 (or from the image capturing device 308), and thereby may determine the dimensions of the room 302 and the dimensions of the plurality of objects 120. Similarly, based on the depth information, the electronic apparatus 304 may determine a 3D position of each of the plurality of objects 120 in the room 302. The electronic apparatus 304 may thereby generate the 3D model of the room 302 based on the determined dimensions of the room 302 and the determined 3D position of each of the plurality of objects 120 in the room 302. In some embodiments, the electronic apparatus 304 may render the generated 3D model of the room 302 in a simulated environment (such as, a Virtual Reality (VR), a Mixed Reality (MR), or Augmented Reality (AR) environment) to represent the room 302. This may allow the listener 316 to visualize the room 302 in the simulated environment, for example, via the display screen 210). In an embodiment, the display screen 210 may correspond to a head-mounted virtual-reality display device worn by the listener 316 and communicably coupled to the electronic apparatus 304.

The electronic apparatus 304 may be configured to apply the ML model 114 on the generated 3D model of the room 302, to determine the plurality of objects 120 present in the room 302 and one or more acoustic parameters of the plurality of objects 120. The ML model 114 may be configured to identify the plurality of objects 120 based on the generated 3D model. The ML model 114 may be trained based on a training set for detection and identification of the plurality of objects 120 present in the generated 3D model. By way of example, the ML model 114 may be a trained Convolutional Neural Network (CNN), or a variant thereof. The ML model 114 may output a likelihood for a detected object in the generated 3D model. Such likelihood may be indicative of a specific class label (or an object class) for the detected object, for example, the display device 310 (i.e. TV) or the sofa 314. In an example, the ML model 114 may be configured to generate a bounding box for each of the plurality of objects 120 (such as, the display device 310 (i.e. TV), the window 312, and the sofa 314). Thereafter, the ML model 114 may be further configured to generate a class confidence score in order to identify the plurality of objects 120 as the display device 310 (i.e. TV), the window 312, or the sofa 314.

The ML model 114 may be further configured to determine the one or more acoustic parameters of the plurality of objects 120. The one or more acoustic parameters may correspond to an acoustic behavior of each of the plurality of objects 120 present in the room 302. Examples of the one or more acoustic parameters may include, but are not limited to, at least one of: an absorption coefficient, a reflection coefficient, a dimension, a volume, or a surface material, associated with each of the determined plurality of objects 120. The absorption coefficient of an object (such as the display device 310 (i.e. TV), the window 312, or the sofa 314) may correspond to an ability of the object to absorb a sound present in the room 302 and generate a corresponding frequency response of the sound. In an example, an absorption coefficient of the display device 310 (i.e. TV) may be different from an absorption coefficient of the sofa 314. The reflection coefficient of an object (such as the display device 310 (i.e. TV), the window 312, or the sofa 314) may correspond to an ability of the object to reflect a sound present in the room 302 and generate a corresponding frequency response of the sound. The dimension of an object (such as the display device 310 (i.e. TV), the window 312, or the sofa 314) may correspond to a physical length, width, and height of the object. The dimension of the object may affect the frequency response that may be generated for the sound present in the room 302. This may be because the surface area or the dimensions of the object may influence the absorption and the reflection of the sound.

In an embodiment, the electronic apparatus 304 may be configured to apply the ML model 114 on the generated 3D model of the room 302 to determine a surface material, as the one or more acoustic parameters, of each of the determined plurality of objects 120. The ML model 114 may be configured to determine the surface material of each of the determined plurality of objects 120 using texture mapping. The electronic apparatus 304 may be further configured to determine the reflection coefficient or the absorption coefficient of each of the plurality of objects based on the determined surface material. In an example, the surface material of the sofa 314 may be a material 'A' (such as, foam) with an ability to absorb sound, (i.e., a high absorption coefficient), whereas the surface material of the display device 310 (i.e. TV) may correspond to a material 'B' (such as, glass, in case of an LCD or LED screen) with an ability to reflect sound, (i.e., a high reflection coefficient). The electronic apparatus 304 may thereby determine the one or more acoustic parameters of the plurality of objects 120 based on the determined object and the surface material of the object.

In an embodiment, memory 204 of the electronic apparatus 304 may be configured to store an association between the reflection coefficients and/or absorption coefficients of different surface materials of objects in the form of a look-up table. Based on the determined surface material of the object, the electronic apparatus 304 may be configured to extract the reflection coefficient or the absorption coefficient of each of the plurality of objects from the stored lookup table in the memory 204. Therefore, the reflection coefficient and/or the absorption coefficient of different plurality of objects 120 with different surface materials are pre-stored in the memory 204 associated with the electronic apparatus 304. The electronic apparatus 102 may be further configured to determine the distance from the electronic apparatus 102 (or the position of the listener 316) to the plurality of objects 120 from the generated 3D model of the room 302. The determination of the distance is described, for example, in FIGS. 4A-4B.

The electronic apparatus 304 may be further configured to control the audio capturing device 306 to determine a first frequency response (such as, an impulse response) for a first sound present in the room 302 based on the determined one or more acoustic parameters of the determined plurality of objects 120 present in the room 302. For example, for the determination of the first frequency response of the first sound in the room 302, the audio capturing device 306 may capture the first sound (for example, an ambient sound) present in the room 302 considering no physical audio reproduction device (i.e. speaker) is present or reproducing the first sound in the room 302. The first sound captured by the audio capturing device 306 may be an audio sample that may be captured by the audio capturing device 306 directly or after certain reflections and/or absorptions from the walls, ceiling, furniture or different objects (such as, the display device 310, and the sofa 314) in the room 302. In some embodiments, the audio capturing device 306 may not be integrated in the electronic apparatus 304 as shown in FIG. 3A. The audio capturing device 306 may be located at one or more positions in the room 302 to measure the first sound of the room 302. In some embodiments, the first sound may a sound (for example test sound) reproduced by a real one or more audio reproduction devices (i.e. real speakers) physically present inside the first enclosed physical space 104 (i.e. room 302). In such case, for the determination of the first frequency response of the first sound in the room 302, the audio capturing device 306 may capture the first sound (for example, sound reproduced by real speakers) present in the room 302. The audio capturing device 306 may further transmit the captured first sound (either ambient or real sound) to the electronic apparatus 102 to determine the first frequency response based on the determined one or more acoustic parameters of the determined plurality of objects 120 present in the room 302. Examples of techniques that the electronic apparatus 304 may use to determine the first frequency response for the first sound based on the determined one or more acoustic parameters may include, but are not limited to, a Fourier Transform technique, a Discrete Cosine Transform technique, a Cepstrum Analysis technique, or Linear Prediction Residuals-based technique.

With reference to FIG. 3B, there is shown an exemplary scenario 300B. In the exemplary scenario 300B, there is shown the room 302, which may include the plurality of objects (as described, for example, in FIG. 3A). As shown in FIG. 3B, there is shown a first audio reproduction device 318, as an exemplary implementation of one of the one or more first audio reproduction devices 122 of FIG. 1. Therefore, the description of the first audio reproduction device 318 is omitted from the disclosure for the sake of brevity. The first audio reproduction device 318 may correspond to a virtual audio reproduction device that may not be physically present in the room 302 in real. In FIG. 3B, there is further shown the electronic apparatus 304, the audio capturing device 306, and the image capturing device 308, as shown and described in FIG. 3A. In an embodiment, the first audio reproduction device 318 may be positioned on the generated 3D model of the room 302 at a particular 3D position as shown, for example, in FIG. 3B.

The electronic apparatus 304 may be further configured to apply, on the generated 3D model of the room 302 and on the determined first frequency response, a plurality of combinations of the plurality of operational modes associated with the one or more first audio reproduction devices (such as, the first audio reproduction device 318), and one or more three-dimensional (3D) positions of the first audio reproduction device 318 in the room 302. The memory (e.g., the memory 204) may be configured to store the plurality of operational modes associated with the first audio reproduction device 318. In an embodiment, each operational mode of the plurality of operational modes may indicate at least one of, but not limited to, a volume setting, a gain setting, a filter setting, or an equalization setting, associated with the first audio reproduction device 318. For example, one of the plurality of operational modes may indicate a value of gain setting (in dB) for a particular frequency to perform audio equalization. In another example, one of the plurality of operational modes may indicate the volume setting (i.e. volume level) corresponding to the particular frequency in order to control the first audio reproduction device 318 to provide desired sound output in the room 302 (for example virtually). In another example, one of the plurality of operational modes may indicate a frequency range, or bandwidth, which may be equalized to a particular equalization setting (such as, but not limited to, a jazz mode, party mode, classic mode, rock mode, sports mode, and the like). In another example, one of the plurality of operational modes may indicate the filter setting that may correspond to values for filter coefficients associated with a filter (such as, a finite impulse response (FIR) filter or an infinite impulse response (IIR) filter) of the first audio reproduction device 318.

The plurality of combinations may indicate model information of the first audio reproduction device 318, information about the plurality of operational modes associated with the first audio reproduction device 318, and information about the one or more 3D positions of the first audio reproduction device 318 in the room 302. The electronic apparatus 304 may be further configured to store the plurality of combinations of the model information, the plurality of operational modes associated with the first audio reproduction device 318, and the one or more 3D positions of the first audio reproduction device 318 in the memory (e.g., the memory 204) as a look-up table. Examples of the stored plurality of combinations, are presented in Table 1, as follows:

TABLE 1

Exemplary plurality of combinations

| Combinations | Number of first audio reproduction devices in the room 302 | Model information | 3D Position in the room 302 | Operational Mode for the combination |
|---|---|---|---|---|
| First Combination | 1 | ABC | Pos1 (X1, Y1, Z1) | Mode 1 |
| Second Combination | 1 | ABC | Pos2 (X2, Y2, Z2) | Mode 2 |
| Third Combination | 2 | ABC, PQR | Pos2 (X2, Y2, Z2) Pos3 (X3, Y3, Z3) | Mode 2, Mode 3 |
| Fourth Combination | 1 | PQR | Pos1 (X1, Y1, Z1) | Mode 1 |
| Fifth Combination | 3 | ABC1, ABC2, EFG, | Pos1 (X1, Y1, Z1) Pos2 (X2, Y2, Z2) Pos3 (X3, Y3, Z3) | Mode 1, Mode 2, Mode 3 |

It should be noted that data provided in Table 1 for the plurality of combinations is for exemplary purposes and should not be construed to limit the present disclosure. In an example, the look-up table (for example, as shown in Table 1) may store an association (or relationship) between the plurality of operational modes associated with the first audio reproduction device 318 (e.g. a particular speaker model), and the one or more 3D positions of the first audio reproduction device 318 in the room 302. In an example, a first combination (i.e. applied on FIG. 3B) of the plurality of combinations may indicate the operational mode (such as, Mode 1) for a model (such as 'ABC') of an audio reproduction device. The Mode 1 may indicate, for example, a volume setting 'V1', a gain setting 'G1', and/or a filter setting 'coefficients f0, f1 . . . fn'. In FIG. 3B, the first audio reproduction device 318 may correspond to the model 'ABC' which may be located at a 3D position (such as, the Pos1 (X1, Y1, Z1) in the room 302 as also indicated in the first combination. Further, the first audio reproduction device 318 may be operating in the operational mode such as, the Mode 1, as defined by the first combination of the exemplary table, such as the Table 1.

In an embodiment, the electronic apparatus 304 may be configured to receive one or more user inputs using an I/O device (e.g., the I/O device 208) from the listener 316. The one or more user inputs may be indicative of the model information of the one or more first audio reproduction devices (e.g., the first audio reproduction device 318), and the one or more 3D positions of the one or more first audio reproduction devices (e.g., the first audio reproduction device 318) in the enclosed physical space (e.g., the room 302). In some embodiments, received user input may also indicate the operational mode (for example volume 90 percent) of the first audio reproduction device 318. The electronic apparatus 304 may be further configured to generate information about the plurality of combinations of the model information, plurality of operational modes, and the one or more 3D positions of the one or more first audio reproduction devices (e.g., the first audio reproduction device 318) in the enclosed physical space (e.g., the room 302). The generation of the plurality of combinations may be based on the received one or more user inputs from the listener 316. In an example, the received user inputs may be indicative of the model information 'ABC', the operational mode as 90 percent volume, and a 3D position 'Pos1 (X1, Y1, Z1)' of the first audio reproduction device 318 in the room 302, and thus, with reference to Table 1, the combination generated based on the received input may correspond to the 'first combination' of the plurality of combinations. In an embodiment, the electronic apparatus 304 may be configured to generate the plurality of combinations for the received model information 'ABC', and the 3D position 'Pos1 (X1, Y1, Z1)' in the room 302 for each of the plurality of operational modes (for example volume 90 percent, volume 50 percent, or equalization setting as classic mode) associated with the model 'ABC' of the first audio reproduction device 318. In another embodiment, the electronic apparatus 304 may generate the plurality of combinations for the first audio reproduction device 318 (with model 'ABC') for different 3D positions in the room 302 and different operational modes mentioned in the user inputs received from the listener 316. Different 3D position for the first audio reproduction device 318 is described, for example, at FIG. 3C. The user inputs received from the listener 316 may provide information about different audio reproduction devices (such as the first audio reproduction device 318 and the audio reproduction device 322 shown in FIG. 3D), information about their 3D positions in the 3D model for the room 402, and their corresponding operational modes, to generate the plurality of combinations, as indicated in Table 1, as example. In some embodiments, the 3D positions in the room 302 and different operational modes for the first audio reproduction device 318 (or for other audio reproduction devices) are already predefined in the memory 204 of the electronic apparatus 304 and may not be received from the listener 316.

The electronic apparatus 304 may be further configured to generate a second frequency response of the room 302 based on the application of each of the plurality of combinations on the generated 3D model and on the determined first frequency response for the first audio reproduction device 318 shown in FIG. 3B. In an example, the first combination of the plurality of combinations, with reference to Table 1, may be applied on the generated 3D model of the room 302 and the first frequency response determined for the first sound (i.e. ambient sound or real sound) present in the room 302. In such a case, the electronic apparatus 304 may virtually position the first audio reproduction device 318 at the Pos1 in the generated 3D model and may thereby update the generated 3D model. The electronic apparatus 304 may use the ML model 114 to update the one or more acoustic parameters based on the updated 3D model, which may include the virtually positioned first audio reproduction device 318. For example, the one or more acoustic parameters may be updated based on at least one of, but not limited to, an absorption coefficient, a reflection coefficient, a dimension, a volume, and a surface material of the first audio reproduction device 318, which may be predefined and stored in the memory 204 for the first audio reproduction device 318 of particular model (such as "ABC"). Further, the electronic apparatus 304 may apply the plurality of operational modes of the first audio reproduction device 318 and the updated one or more acoustic parameters (based on the updated 3D model) on the first frequency response for the first sound (e.g., the ambient sound or the real sound) in the room 302, to generate the second frequency response after inclusion of the first audio reproduction device 318 in the generated 3D model for the room 302. As previously discussed, the first frequency response for the first sound may be based on the one or more acoustic parameters of the plurality of objects 120. Based on the application of the plurality of operational modes and the updated one or more acoustics parameters (i.e. for the 3D position Pos1 as shown in FIG. 3B) on the first frequency response, the electronic apparatus 304 may generate the second frequency response for the first combination. The generation of the second frequency response may be based on one or more techniques, such as, but are not limited to, a Fourier Transform technique, a Discrete Cosine Transform technique, a Cepstrum Analysis technique, or Linear Prediction Residuals-based technique. Similarly, electronic apparatus 304 may generate the second frequency response for each of the plurality of combinations determined for the first audio reproduction device 318 positioned at Pos1 (i.e. 3D position) in the room 302. The generation of the second frequency response may correspond to an update from the first frequency response (i.e. generated for the first sound in the room 302) to the second frequency response based on knowledge about the 3D position of the newly included first audio reproduction device 318 in the room 302, operational mode (i.e. 90 percent volume) of the first audio reproduction device 318, the acoustic parameters (i.e. reflection or absorption coefficients) and dimensions of the first audio reproduction device 318. The dimension of the first audio reproduction device 318 may be extracted based on the model information of the first audio reproduction device 318. The electronic apparatus 304 may be configured to update the first frequency response based on such knowledge about the virtually positioned first audio reproduction device 318 to generate the second frequency response for the first combination (i.e. as indicated in Table 1).

Based on the determined second frequency response for the first combination, the electronic apparatus 304 may generate a virtual audio output of the first audio reproduction device 318 for the generated 3D model of the room 302. The electronic apparatus 304 may further reproduce the generated virtual audio output, via the second audio reproduction device 116 (not shown in FIG. 3B). The second audio reproduction device 116 may be an internal speaker or headphones, which may be coupled with the first enclosed physical space 104. The real reproduction of the virtual audio output for the first combination may provide a realistic audio experience to the listener 316 for the audio reproduction virtualization in the room 302 in which the first audio reproduction device 318 may be positioned at the Pos1. Based on the audio reproduction virtualization and the real reproduction, the listener 316 may hear the virtual audio output associated with the first audio reproduction device 318, via an I/O device (such as, the I/O device 208) of the electronic apparatus 304. In an embodiment, the I/O device 208 may correspond to a pair of headphones or earphones communicatively coupled to the head-mounted virtual reality display device worn by the listener 316, such that the listener 316 may visualize the generated 3D model of the room 302 and simultaneously hear the virtual audio output. Therefore, the electronic apparatus 304 may generate the second frequency response for each of the plurality of combinations for the first audio reproduction device 318, where each of the plurality of combinations may define different operational modes for the first audio reproduction device 318 position at the 3D position Pos1 as shown in FIG. 3B. In an embodiment, the electronic apparatus 304 may only generate the second frequency response for the first combination with one operational mode of the first audio reproduction device 318, such as the operational mode with maximum volume level or volume level of particular level (say 90 percent). The electronic apparatus 304 may further control the I/O device 208 (i.e. internal speaker or headphones) to reproduce the audio output (i.e. virtual audio) for each of the generated second frequency response for the plurality of combinations for the first audio reproduction device 318 position at the 3D position Pos1.

In an embodiment, the electronic apparatus 304 may be configured to compare the generated second frequency response of the room 302 for each of the plurality of combinations for the first audio reproduction device 318, with a first target frequency response of the room 302. Based on the comparison, the electronic apparatus 304 may be configured to select a combination from the plurality of combinations. The first target frequency response may correspond to a predefined frequency response of the room 302, for example frequency response which may provide optimal audio experience to the listener 316 considering the room 302, the plurality of objects 120 determined in the room 302, and the dimensions of the room 302 and the plurality of objects 120. The selected combination (for example the first combination) may indicate that the first audio reproduction device 318 is of the model 'ABC', positioned at the 3D position Post and operate at the selected operational mode to generate the second frequency response which matches with the first target frequency response In an embodiment, the electronic apparatus 304 may be configured to receive a user input, via an I/O device (e.g., the I/O device 208) from the listener 316, to set the first target frequency response for the room 302 including the plurality of objects 120. In another embodiment, the electronic apparatus 304 may be configured to set a default first target frequency response. The electronic apparatus 304 may be configured to determine a percentage match between the generated second frequency response for each combination with respect to the first target frequency response to select the particular combination (such as the first combination) from the plurality of combinations. In accordance with an embodiment, the electronic apparatus 304 may receive the user input from the listener 316, via the I/O device 208, to select the particular combination (such as the first combination) based on the audio reproduction for each of the generated second frequency responses. The selected combination may provide the optimal audio experience to the listener 316 in the room 302 for the first audio reproduction device 318 (i.e. virtual speaker) before the purchase of the actual speaker with same model information (such as 'ABC' of the first audio reproduction device 318). Thus, the listener 316 may experience the audio reproduction of the generated frequency responses for different combinations (with different operational modes) for the first audio reproduction device 318 positioned at 3D position Pos1 (shown in FIG. 3B) before the actual purchase of the first audio reproduction device 318 in real.

In accordance with an embodiment, the electronic apparatus 304 may be configured to display output information associated with the selected first combination. The output information may include the model information of the selected audio reproduction device, the 3D positions of the selected audio reproduction device, and the selected operational mode of the selected audio reproduction device, as described, for example, in FIG. 5.

Figure 3C:
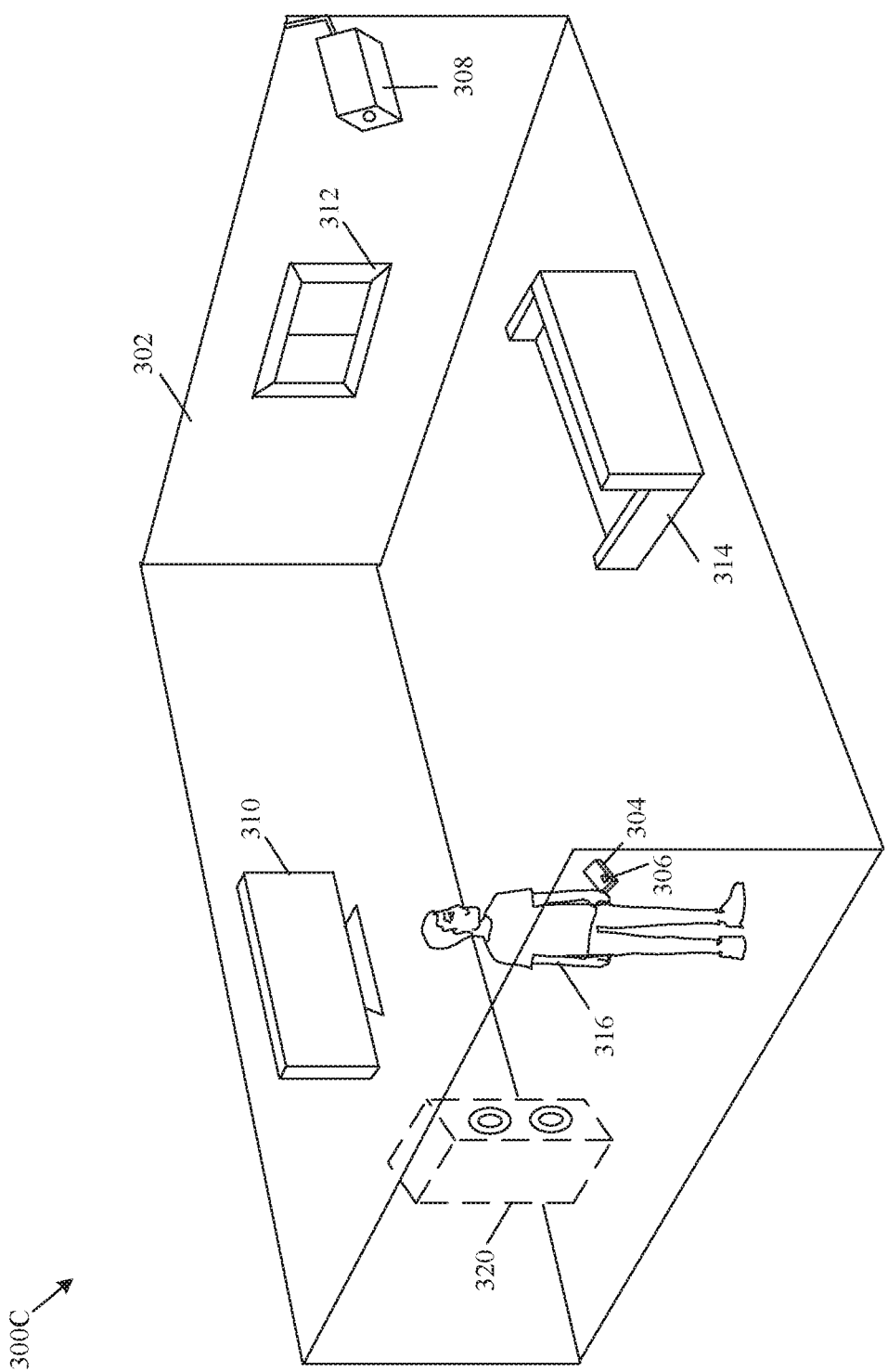

With reference to FIG. 3C, there is shown an exemplary scenario 300C. In the exemplary scenario 300C, there is shown the room 302, which may include the plurality of objects (as described, for example, in FIG. 3A). As shown in FIG. 3C and with reference to Table 1, an audio reproduction device 320 (i.e. virtual speaker) may correspond to the model 'ABC' and may be located at a 3D position (such as, the Pos2 (X2, Y2, Z2) in the room 302. Therefore, the audio reproduction device 320 may be same as the first audio reproduction device 318 shown in FIG. 3B, however, the audio reproduction device 320 may be located at the different 3D position, as shown in FIG. 3C. The electronic apparatus 304 may receive the user input from the listener 316 to position the same audio reproduction device at different 3D position in the generated 3D model of the room 302, to further check the generated second frequency response and experience the audio output as described, for example, in FIG. 3B. In some embodiments, the electronic apparatus 304 may automatically re-position the same audio reproduction device 320 at predefined 3D positions (for example first at the 3D position like Pos1, shown in FIG. 3B, and then to another 3D position like Pos2, shown in FIG. 3C). In an example, the audio reproduction device 320 may be operate in the operational mode such as, the Mode 2 (i.e., the second combination, as shown in Table 1). For example, the Mode 2 may be a different operational mode as compared to Mode 1 described, for example, in FIG. 3B. Therefore, the second combination may indicate the model information of the audio reproduction device 320, the 3D position (i.e. Pos2), the operational mode to be applied for the generation of the second frequency response. The circuitry 202 of the electronic apparatus 304 may be further configured to generate a second frequency response of the room 302 based on the application of each of the second combination (as described in the table 1) on the generated 3D model and on the determined first frequency response, as described, for example, in FIG. 3B.

It may be noted that the generated second frequency response for the first combination of the plurality of combinations may be different from the generated second frequency response for the second combination of the plurality of combinations as 3D positions of the first audio reproduction device 318 and the audio reproduction device 320 are different, as shown in FIGS. 3B and 3C.

Figure 3D:
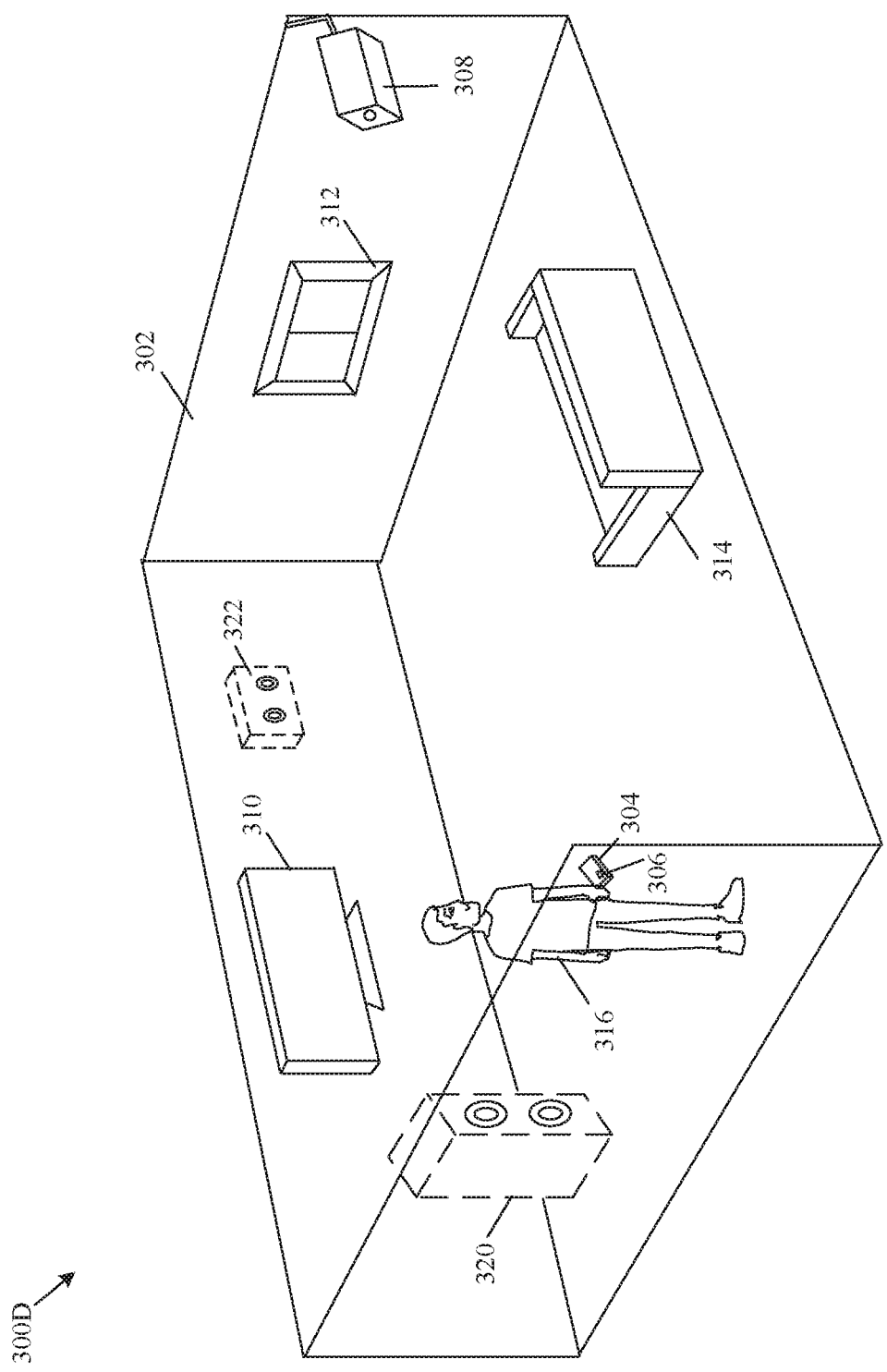

With reference to FIG. 3D, there is shown an exemplary scenario 300D. In the exemplary scenario 300D, there is shown the room 302, which may include the plurality of objects (as described, for example, in FIG. 3A). As shown in FIG. 3D, there is shown, the audio reproduction device 320 (also shown and described in FIG. 3C) and an audio reproduction device 322 (i.e. audio reproduction device different from the audio reproduction device 320). The audio reproduction device 322 may correspond to the model 'OR' and may be located at a 3D position (such as, the Pos3 (X3, Y3, Z3) in the room 302. Further, with reference to Table 1, the audio reproduction device 320 and the audio reproduction device 322 may operate in the operational mode such as, the Mode 2 and Mode 3, respectively. Therefore, as shown in FIG. 3D, there may be multiple virtual audio reproduction devices may be positioned (i.e. at same or different 3D positions) on the generated 3D model to experience the audio output based on the multiple audio reproduction devices for the room 302. The multiple virtual audio reproduction devices (such as the audio reproduction device 320 operate at Mode 1 and positioned at 3D position Pos2, and the audio reproduction device 322 operate at Mode 2 and positioned at 3D position Pos3) may form the third combination, as shown in Table 1. It may be noted that in light of multiple audio reproduction devices, the information about the plurality of combinations may indicate different audio reproduction devices, their respective operational modes, and respective 3D positions in the room 302, which may be predefined or defined based on the user inputs received from the listener 316 to experience audio output of various combinations before the actual purchase of one or more audio reproduction devices. In accordance with an embodiment, the electronic apparatus 304 may be further configured to generate a second frequency response of the room 302 based on the application of the third combination (as described in the Table 1) on the generated 3D model and on the determined first frequency response, as described, for example, in FIG. 3B.

It may be noted that the generated second frequency response for the third combination of the plurality of combinations may be different from the generated second frequency response for the first combination, and generated second frequency response for the second combination of the plurality of combinations as the operational modes, model information and the 3D positions are different in the first combination, the second combination, and the third combination, as shown in FIGS. 3B-3D. The electronic apparatus 304 may further compare each of the plurality of combinations (like first combination shown in FIG. 3B, the second combination shown in FIG. 3C, and the third combination shown in FIG. 3D) with the first target frequency response to select the particular combination which may provide the best or optimal audio experience to the listener 316 and matches with the first target frequency response either set by the listener 316 or defined for the generated 3D model of the room 302.

It may be noted that three combinations of the plurality of combinations described in FIGS. 3B-3D, are merely presented as an example. The electronic apparatus 304 may generate N number of combinations based on different number of audio reproduction devices (for example mentioned in the user inputs), their respective operational modes, and different 3D positions for the room 302, to determine the particular combination from the plurality of combinations, without a deviation from the scope of the disclosure. For example, one of the plurality of combinations may indicate six audio reproduction devices (i.e. two virtually positioned at both ends of the display device 310 (i.e. TV) and one audio reproduction device virtually positioned at each corner of the room 402), and further indicate respective operational modes (such as volume setting, gain setting, equalization setting, frequency setting, or filter setting) for each audio reproduction device virtually positioned in the 3D model generated for the room 402.

In accordance with an embodiment, the electronic apparatus 304 may be further configured to receive a user input from the listener 316, which may indicate one or more dimensions of the enclosed physical space (such as, the first enclosed physical space 104 or the room 302). The electronic apparatus 304 may be configured to generate the second frequency response for each of the plurality of combinations based on the received user input which indicates the dimensions of the first enclosed physical space 104. In an example, the user input may be indicative of a dimension of a concert hall (or a cinema hall which may be bigger than the room 302). The electronic apparatus 304 may be configured to generate a 3D model of the concert hall (or the cinema hall) based on the received user input. For example, a room size of the concert hall or the cinema hall may be determined based on the received user input indicative of the dimension of the enclosed physical space. Further, the electronic apparatus 304 may receive another user input indicative of plurality of objects present in the concert hall or the cinema hall. For example, the user input may indicate a number of objects, a type of objects, a material of objects, and a location of objects in the concert hall. Examples of such objects may include, but are not limited to, a podium, a plurality of seats on the podium, an audience seating area, and a plurality of seats in the audience seating area. The electronic apparatus 304 may be configured to generate the 3D model of the concert hall or the cinema hall. In some embodiments, the electronic apparatus 304 may receive one or more images captured by an image capturing device positioned in the concert hall or the cinema hall. The one or more images of the concert hall may be prestored in the memory 204 of the electronic apparatus 304. The electronic apparatus 304 may apply the ML model 114 on the captured images to determine the plurality of objects, dimensions of the objects, materials of the objects and the acoustic parameters of the objects determined in the concert hall or the cinema hall, as described, for example in FIGS. 1 and 3A.

The electronic apparatus 304 may be further configured to determine a first frequency response for a first sound (e.g. ambient sound or real sound as described for example at FIG. 3A) that may be present in the concert hall based on the determined one or more acoustic parameters of the determined plurality of objects present in the concert hall or the cinema hall. The first sound may be captured using one or more audio capturing devices (such as, the audio capturing device 112) positioned at different positions of the concert hall or the cinema hall, as also described, for example, in FIG. 3A. Thus, the disclosed electronic apparatus 304 may allow the automatic and real-time generation of the first frequency response for the first sound present in the concert hall, based on the reception of the first sound captured by the audio capturing devices (such as low-cost microphones)

placed at different desired 3D positions in the concert hall. The automatic generation of the first frequency response by the disclosed electronic apparatus 304, may not require skilled sound technicians. In some embodiments, the electronic apparatus 304 (including the audio capturing device 112) may be positioned at different places in the concert hall to capture the first sound and generate the first frequency response (i.e. impulse response) for the concert hall.

The circuitry 202 of the electronic apparatus 304 may be further configured to generate the second frequency responses for the concert hall (or the cinema hall) based on the application of each of the plurality of combinations of different audio reproduction devices (i.e. virtual speakers) on the generated 3D model and on the determined first frequency response for the concert hall, as similarly described, for example, in FIGS. 3B-3D. The audio reproduction of the generated second frequency responses may allow a user (e.g., the listener 316) to remotely experience audio for the plurality of combinations of different audio reproduction devices (say virtually present) in the concert hall or remotely experience audio for a selected combination associated with a selected one or more first audio reproduction devices in a simulated environment for the concert hall (or the cinema hall), without actually being present in the concert hall and actually purchasing the audio reproduction devices for the concert hall. It may be noted that the description of the concert hall (or the cinema hall) is merely presented an example. The electronic apparatus 304 may identify the combination of audio reproduction devices, their operational modes, and their 3D positions in different physical spaces for optimal audio detection (i.e. without actually being present in the desired physical space), based on the generation of 3D models, and the first frequency response; and knowledge about the dimensions of physical space, and objects, and the acoustic parameters related to objects in different physical spaces, without a deviation from the scope of the disclosure.

In an embodiment, the electronic apparatus 304 may be configured to control a second audio reproduction device (such as, the second audio reproduction device 116 such as internal speaker or headphone as described, for example, in FIG. 3B) to reproduce a second sound based on the second frequency response general for each of the plurality of combinations. The electronic apparatus 304 may be configured to receive a user input, (via the I/O device 208) indicative of a selection of a particular combination (such as the first combination) from the plurality of combinations. The electronic apparatus 304 may be configured to select the first combination based on the reproduced second sound for each of the plurality of combinations and the received user input. For example, the listener 316 may hear an audio output (in real) reproduced by the second audio reproduction device 116 and provide the user input to the electronic apparatus 304. The electronic apparatus 304 may configured to receive the user input indicative of a percentage of a likeability of the reproduced audio output associated with each of the plurality of combinations, for the listener 316. Based on the received user input, the electronic apparatus 304 may be configured to select the first combination from the plurality of combinations. For example, the electronic apparatus 304 may select the first combination as a combination that may be assigned the highest percentage of likeability and/or the optimal audio experience out of all the plurality of combinations.

In accordance with an embodiment, the electronic apparatus 304 may be configured to determine a reverberation time for an enclosed physical space (e.g., the room 302), based on a volume of the enclosed physical space (e.g., the room 302), and a reflecting area or an absorbing area of the enclosed physical space (e.g., the room 302). The reverberation time may correspond to a time taken by a sound output to attenuate (or fade away or decay) by a particular amount (for example, such as 60 decibels (dB)). In an embodiment, the reverberation time may be determined based on a dimension of the enclosed physical space (such as, the volume of the enclosed physical space, such as the room 302) and an area occupied by the plurality of objects 120 present in the enclosed physical space (e.g., the room 302). The area occupied by the plurality of objects 120 may correspond to the reflecting area or the absorbing area in the enclosed physical space (e.g., the room 302). In some embodiments, the reflecting area or the absorbing area may be based on the one or more acoustic parameters (such as, the reflection coefficient, or absorption coefficient) of the plurality of objects 120. In an example, if the sound output (for example real sound reproduced by a real speaker in the room) is of 110 dB, the reverberation time may correspond to a time taken by the sound output to attenuate by 60 dB (i.e. from 110 dB to 50 dB) while it travels in the enclosed physical space (e.g., the room 302). For example, the electronic apparatus 304 may determine the reverberation time of the sound output for the enclosed physical space (e.g., the room 302) based on an equation (1), as follows:

$$RT60=0.163*V/A \quad (1)$$

where,

RT60 represents the reverberation time of the enclosed physical space (e.g., the room 302), "V" represents the volume of the enclosed physical space (e.g., the room 302), expressed in $m^3$, and "A" represents the reflecting area or the absorbing area of the enclosed physical space (e.g., the room 302), expressed in $m^2$.

The electronic apparatus 304 may determine the reflecting area or the absorbing area of the enclosed physical space (e.g., the room 302) based on an equation (2), as follows:

$$A=\alpha_1 S_1 + \alpha_2 S_2 + \ldots + \alpha_a S_a \quad (2)$$

where,

"S" represents the area of a specific part (such as the plurality of objects 120) of the enclosed physical space (e.g., the room 302), and "α" represents the absorption coefficient or the reflection coefficient of the surface of particular part (such as the plurality of objects 120).

The electronic apparatus 304 may be further configured to generate the second frequency response for each of the plurality of combinations based on the reverberation time determined for the real sound present in the enclosed physical area (e.g., the room 302), during the application of each of the plurality of combinations on the generated 3D model of the enclosed physical space (such as the room 302) and on the determined first frequency response, as described, for example, in FIG. 3B. In an embodiment, the second frequency response may be generated using image-source model (ISM) technique, or any other known techniques to generate the second frequency response. In an embodiment, the reverberation time that may be determined for an enclosed physical space with smaller dimensions may be lower, as compared to a reverberation time that may be determined for an enclosed physical space with larger dimensions. Thus, the electronic apparatus 304 may consider another factor (such as the reverberation time) for the generation of the second frequency responses, in addition to other factors, such as the dimensions of the first enclosed physical space 104, dimensions of the plurality of objects 120, the first target frequency response, and combinations of virtual audio reproduction devices (and their operational modes and 3D positions) as described, for example, in FIGS. 3B-3D.

Figure 4A:
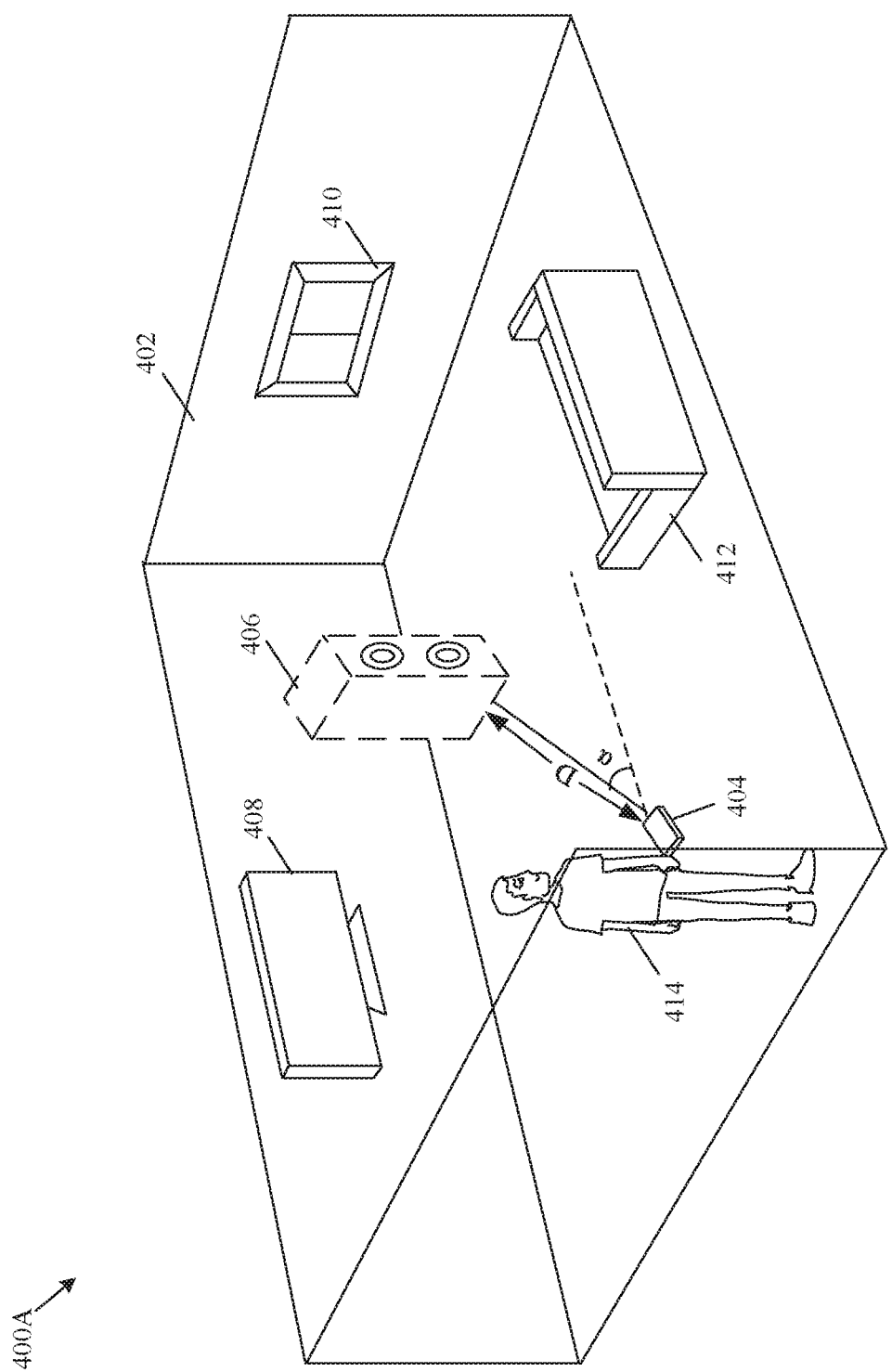
FIGS. 4A and 4B are diagrams that illustrate exemplary scenarios for determination of a second frequency response for an enclosed physical space based on one or more parameters of a head-related transfer function (HRTF), in accordance with an embodiment of the disclosure.
Figure 4B:
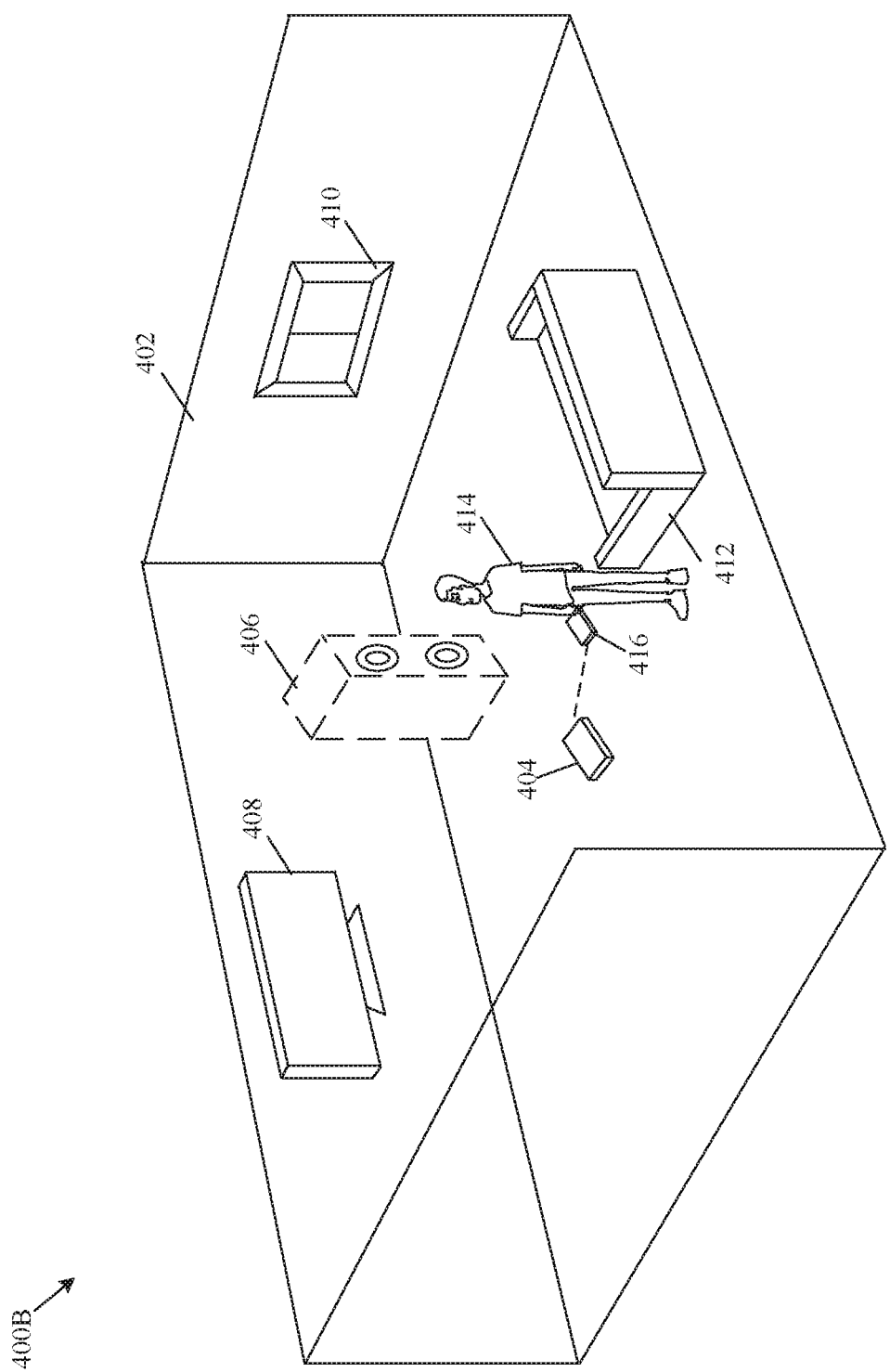

FIGS. 4A and 4B are diagrams that illustrate exemplary scenarios for determination of a second frequency response for an enclosed physical space based on one or more parameters of a head-related transfer function (HRTF), in accordance with an embodiment of the disclosure. FIGS. 4A and 4B are explained in conjunction with elements from FIGS. 1, 2, 3A, 3B, 3C, and 3D. With reference to FIG. 4A, there is shown an exemplary scenario 400A. In the exemplary scenario 400A, there is shown a room 402 as an exemplary implementation of the first enclosed physical space 104 of FIG. 1. There is further shown an electronic apparatus 404, as an exemplary implementation of the electronic apparatus 102 of FIG. 1 or the electronic apparatus 304 in FIGS. 3A-3D. There is further shown an audio reproduction device 406 (i.e. virtual speaker), as an exemplary implementation of the one or more first audio reproduction devices 122 of FIG. 1. Therefore, the descriptions of the room 402, the electronic apparatus 404, the audio reproduction device 406 are omitted from the disclosure for the sake of brevity. There is further shown, a display device 408 (i.e. Television (TV)), a window 410, and a sofa 412, which may correspond to the plurality of objects 120 present in the room 402. In the scenario 400A, there is further shown a listener 414. It may be noted that the display device 408 (i.e. TV), the window 410, and the sofa 412 shown as the plurality objects 120 in FIG. 4A as merely an example. The scenario 400A may include other types of the plurality of objects 120, without deviation from the scope of the disclosure.

The electronic apparatus 404 may be configured to determine a 3D listening position present in the enclosed physical space (such as the room 402). The 3D listening position may correspond to a position of the listener 414 present in the room 402. The electronic apparatus 404 may be configured to generate a 3D model of the room 402, as described, for example, in FIGS. 3A-3B. Further, the electronic apparatus 404 may apply the ML model 114 on the generated 3D model of the room 402, to determine the plurality of objects 120 present in the room 402, as described for example, in FIG. 3A. The plurality of objects 120 may also correspond to the listener 414 present in the room 402. In some embodiments, the electronic apparatus 404 may be configured to determine 3D coordinates corresponding to the 3D listening position of the listener 414 in the room 402 based on the generated 3D model of the room 402. In some embodiments, the electronic apparatus 404 may be configured to detect 3D coordinates corresponding to the 3D listening position in the room 402, via a location detection device (not shown) associated with the electronic apparatus 404 with the listener 414. The location detection device may be integrated or communicatively coupled to the electronic apparatus 404 and may employ technologies such as, but not limited to, a global positioning system (GPS) or a Bluetooth™ beacon, to determine the 3D listening position of the listener 414 present in the room 402. In some embodiments, the electronic apparatus 404 may be configured to receive a user input indicative of the 3D listening position, from the listener 414, via an I/O device (such as, the I/O device 208) of the electronic apparatus 404. The electronic apparatus 404 may be configured to determine the 3D listening position of the listener 414 based on the received user input.

The electronic apparatus 404 may be further configured to determine a distance (i.e. "D" shown in FIG. 4A) between the determined 3D listening position and each of the one or more 3D positions of the one or more first audio reproduction devices (e.g., the audio reproduction device 406) virtually present in the room 402 or in the generated 3D model of the room 402. In some embodiments, the electronic apparatus 404 may determine the distance between the positions of the listener 414 and the position of each of the one or more first audio reproduction devices (e.g., the audio reproduction device 406) based on pixel positions of the listener 414 and the one or more first audio reproduction devices captured in the generated 3D model of the room 402 or captured in the one or more images by the 308 (shown in FIGS. 3A-3D).

Further, the electronic apparatus 404 may determine an angle (i.e. "a" shown in FIG. 4A) between the determined 3D listening position of the listener 414 and each of the one or more 3D positions of the one or more first audio reproduction devices (e.g., the audio reproduction device 406). The electronic apparatus 404 may be configured to determine the angle between the determined 3D listening position and the 3D position of the audio reproduction device 406 with respect to a reference axis (shown as, a dotted line) for the room 402. An axis, for example, an axis orthogonal to a line that may join the 3D listening position and the 3D position of the audio reproduction device 406, may be estimated in order to determine the angle. The angle may indicate a specific direction in which the audio reproduction device 406 may located in the room 402 with respect to the reference axis. By way of example, the electronic apparatus 404 may apply a cosine rule to determine the angle between the determined 3D listening position and the 3D position of the audio reproduction device 406 based on the distance between the determined 3D listening position and the 3D position of the audio reproduction device 406. As an example, the angle between the determined 3D listening position of the listener 316 and the 3D position of the audio reproduction device 406 may correspond to 'α', as shown in FIG. 4A.

The electronic apparatus 404 may be further configured to generate the second frequency response for each of the plurality of combinations based on the determined distance and the determined angle. Thus, the electronic apparatus 304 may consider another factor (such as the determined distance and the angle between the 3D listening position of the listener 316 and the 3D positions of the virtually positioned audio reproduction devices) for the generation of the second frequency responses, in addition to other factors, such as the dimensions of the first enclosed physical space 104, dimensions of the plurality of objects 120, the first target frequency response, combinations of virtual audio reproduction devices (and their operational modes and 3D positions), and the reverberation time, as described, for example, in FIGS. 3B-4A. In case of detection of change in the 3D listening position (say before the selection of the first combination) in the 3D model, the electronic apparatus 404 may again determine the distance and the angle between the determined 3D listening position and the 3D position of the audio reproduction device 406 (or multiple audio reproduction devices), and further generate the second frequency response for each of the plurality of combinations for final selection of a particular combination from the plurality of combinations. In another embodiment, in case of any change in the plurality of objects 120 (for example any new object present in the room 402, any change in position of at least one of the plurality of objects 120, any change in surface material of at least one of the plurality of objects 120, or removal of at least one of the plurality of objects 120 from the room 402), the electronic apparatus 404 may be configured to dynamically determine the change, and accordingly re-determine the 3D model of the first enclosed physical space 104 (i.e. room 402) and may further re-generate the second frequency response for the plurality of combinations for final selection of the particular combination from the plurality of combinations.

In accordance with an embodiment, the electronic apparatus 404 may be configured to determine one or more parameters associated with a head related transfer function (HRTF), based on the determined 3D listening position of the listener 414 and each of the one or more 3D positions of the one or more first audio reproduction devices indicated in the information about the plurality of combinations. The electronic apparatus 404 may be further configured to generate the second frequency response for each of the plurality of combinations based on the determined one or more parameters associated with the HRTF. The electronic apparatus 404 may be configured to determine the HRTF associated with the listener 414 based on the first frequency response of the room 402 and user-specific information corresponding to the listener 414. Examples of the user-specific information may include, but are not limited to, a size and 3D position of the head of the listener 414, dimensions of ears of the listener 414, dimensions of ear canals of the listener 414, dimensions of a shoulder of the listener 414, dimensions of a torso of the listener 414, a density of the head of the listener 414, or an orientation of the head of the listener 414. As an example, the HRTF may be determined based on equations (3) and (4), as follows:

$$H_L(r,\theta,\phi,f,a)=P_L(r,\theta,\phi,f,a)/P_0(r,f) \quad (3)$$

$$H_R(r,\theta,\phi,f,a)=P_R(r,\theta,\phi,f,a)/P_0(r,f) \quad (4)$$

where, $H_L$ and $H_R$ represent HRTF functions for left and right ears, respectively, r represents a distance of an audio reproduction device (e.g., the audio reproduction device 406) relative to the head center of the listener 414, θ represents an angle between the 3D listening position and the 3D position of the audio reproduction device (e.g., the audio reproduction device 406), 0 to 360 degrees, φ represents an elevation −90 to 90 degrees, below or above, respectively, with respect to the head center, f represents different frequencies, A represents an individual head, $P_L$ and $P_R$ represent sound pressures at left and right ears, respectively, and $P_0$ represents sound pressures at head center with head absent.

Examples of the one or more parameters associated with the HRTF may include, but are not limited to, a distance between the determined 3D listening position and each of the one or more 3D positions of the one or more first audio reproduction devices, an angle (such as the angle 'α') between the determined 3D listening position and each of the one or more 3D positions of the one or more first audio reproduction devices, and an elevation angle. For example, the one or more parameters associated with the HRTF may include a distance (such as, the distance 'D') between the determined 3D listening position of the listener 414 and each of the one or more 3D positions of the one or more first audio reproduction devices (such as, the audio reproduction device 406), as shown, for example, in FIG. 4A. When the distance (i.e. "D") between the determined 3D listening position and each of the one or more 3D positions of the one or more first audio reproduction devices relative to the head center in the equations (3) and (4)) varies, the value of the HRTF may also vary. In other words, with an increase or a decrease in the distance between the determined 3D listening position and each of the one or more 3D positions of the one or more first audio reproduction devices', the value of the HRTF may also increase or decrease, respectively.

The one or more parameters associated with the HRTF may further include the angle (such as the angle 'α') between the determined 3D listening position and each of the one or more 3D positions of the one or more first audio reproduction devices (such as, the audio reproduction device 406), as shown, for example, in FIG. 4A. When the angle (such as the angle 'α') between the determined 3D listening position and each of the one or more 3D positions of the one or more first audio reproduction devices varies, the value of the HRTF may also vary. The determined angle 'α' in FIG. 4A may correspond to angle 'θ' in the equations (3) and (4). In other words, with increase or decrease in the angle 'α', the value of the HRTF may also vary accordingly, based on equations (3) and (4).

The one or more parameters associated with the HRTF may further include the elevation angle that may correspond to an angle between a horizontal plane of the enclosed physical space (e.g., the room 402), and the one or more 3D positions of the one or more first audio reproduction devices which may be positioned above to the head center of the listener 414. When the elevation angle (such as the elevation angle 'φ' in the equations (3) and (4)) varies, the value of the HRTF may also vary. In other words, with increase or decrease in the angle 'φ', the value of the HRTF may also vary accordingly, based on equations (3) and (4). As an example, the audio reproduction device (such as, the audio reproduction device 322 of FIG. 3D) may be positioned on a wall of the enclosed physical space (e.g., the room 302) that may be substantially raised from a floor of the enclosed physical space (e.g., the room 302). Thus, the circuitry 202 may be configured to determine the elevation angle between the 3D listening position of the listener 316 and the audio reproduction device 322 (shown in FIG. 3D) that may be virtually positioned at a certain height from the floor of the room 302.

The generation of the second frequency response and corresponding audio reproduction (via the second audio reproduction device 116) for each of the plurality of combinations based on the determined one or more parameters associated with the HRTF may provide different audio experience to the listener 414 to select the optimal combination (such as the first combination) based on the receipt of the user input or match with the target frequency response (i.e. described, for example, in FIGS. 3B-3D). In an embodiment, based on the change in the 3D listening position of the listener 414 and/or change in the 3D positions of the one or more audio reproduction devices (such as the audio reproduction device 406) in the 3D model of the room 402, the electronic apparatus 404 may determine the HRTF and generate the second frequency response. The determined HRTF for the changed 3D positions may allow the electronic apparatus 404 to consider the change in the 3D position of an audio source (such as the audio reproduction device 406) such that the generated or updated second frequency response may consider the changed 3D positions of the audio sources. During the audio reproduction (via the second audio reproduction device 116) of such second frequency responses (i.e. updated based on the HRTF) may allow the listener 414 to feel that the sound is coming from the 3D positions of the virtually present audio reproduction devices (such as the audio reproduction device 406) in the room 402.

In accordance with an embodiment, the electronic apparatus 404 may be configured to detect a real audio reproduction device (i.e. real speaker) present in the room 402. The real audio reproduction device (not shown) may be similar to the second audio reproduction device 116, but may not be integrated with the electronic apparatus 404. In such case, the real audio reproduction device may be a part of the detected plurality of objects 120 detected based on the application of the ML model 114, as described, for example, in FIG. 3A. In some embodiments, the real audio reproduction device may be detected from the generated 3D model of the room 402. The electronic apparatus 404 may be further configured to determine the distance ('D') and the angle ('α') between the 3D listening position of the listener 414 and 3D position of the real audio reproduction device in the 3D model or in the room 402, and further calibrate the real audio reproduction device with respect to the generated second frequency response for the plurality of combinations. For the calibration, the electronic apparatus 404 may control an operational mode of the real audio reproduction device such that generated second frequency response may not change significantly due to the presence of the real audio reproduction device or due to the real audio reproduction by the real audio reproduction device. In some embodiments, the electronic apparatus 404 may consider the real audio output reproduced by the real audio reproduction device for the generation of the first frequency response, as the first sound present in the room 402 may correspond to the real audio output reproduced by the real audio reproduction device.

With reference to FIG. 4B, there is shown an exemplary scenario 400B. In the exemplary scenario 400B, there is shown the room 402, which may include the plurality of objects 120 (as described, for example, in FIG. 4A). In FIG. 4B, there is further shown, the electronic apparatus 404, the audio reproduction device 406 (i.e. virtual speaker), and the listener 414. As shown in FIG. 4B, the 3D position of the listener 414 may be away from the electronic apparatus 404. In other words, the electronic apparatus 404 may not be held by the listener 414 (as shown in FIGS. 3A-4A). There is further shown in FIG. 4B, an electronic device 416 associated with the listener 414. The electronic apparatus 404 may be communicatively coupled to the electronic device 416, via the communication network 110 (not shown in FIG. 4B). In an embodiment, the disclosed electronic apparatus 404 may be configured to receive information associated with 3D listening position of the listener 414, from the electronic device 416 (i.e. such as a mobile phone of the listener 414).

The electronic device 416 may include suitable logic, circuitry, code, and/or interfaces that may be configured to transmit the information associated with the 3D listening position of the listener 414 to the electronic apparatus 404. Examples of the electronic device 416 may include, but are not limited to, a computing device, a smartphone, a cellular phone, a mobile phone, a personal digital assistant (PDA), a desktop computer, a laptop computer, a tablet computer, and/or a consumer electronic (CE) device. In an embodiment, the electronic apparatus 404 may be configured to determine the 3D listening position of the listener 414 present in the enclosed physical space (e.g., the room 402) based on the information received from the electronic device 416. Herein, in an example, the electronic device 416 may determine the 3D listening position in the room 402 by use of a GPS sensor included in the electronic device 416, or based on a user input received from the listener 414. Thus, even if the electronic apparatus 404 may not be held by the disclosed electronic apparatus 404, the electronic apparatus 404 may still receive the 3D listening position of the listener 414 in the room based on the information received from another device (such as the electronic device 416) or user inputs provided to the other device. In another embodiment, the electronic apparatus 404 may extract the 3D listening position of the listener 414 from the generated 3D model of the room 402. The electronic apparatus 404 may further determine the second frequency response for different plurality of combinations of audio reproduction devices, their operational modes and 3D positions, based on the determined 3D listening position of the listener 414 and determined distance and angle with each of the audio reproduction devices, as described, for example, in FIG. 4A.

Figure 5:
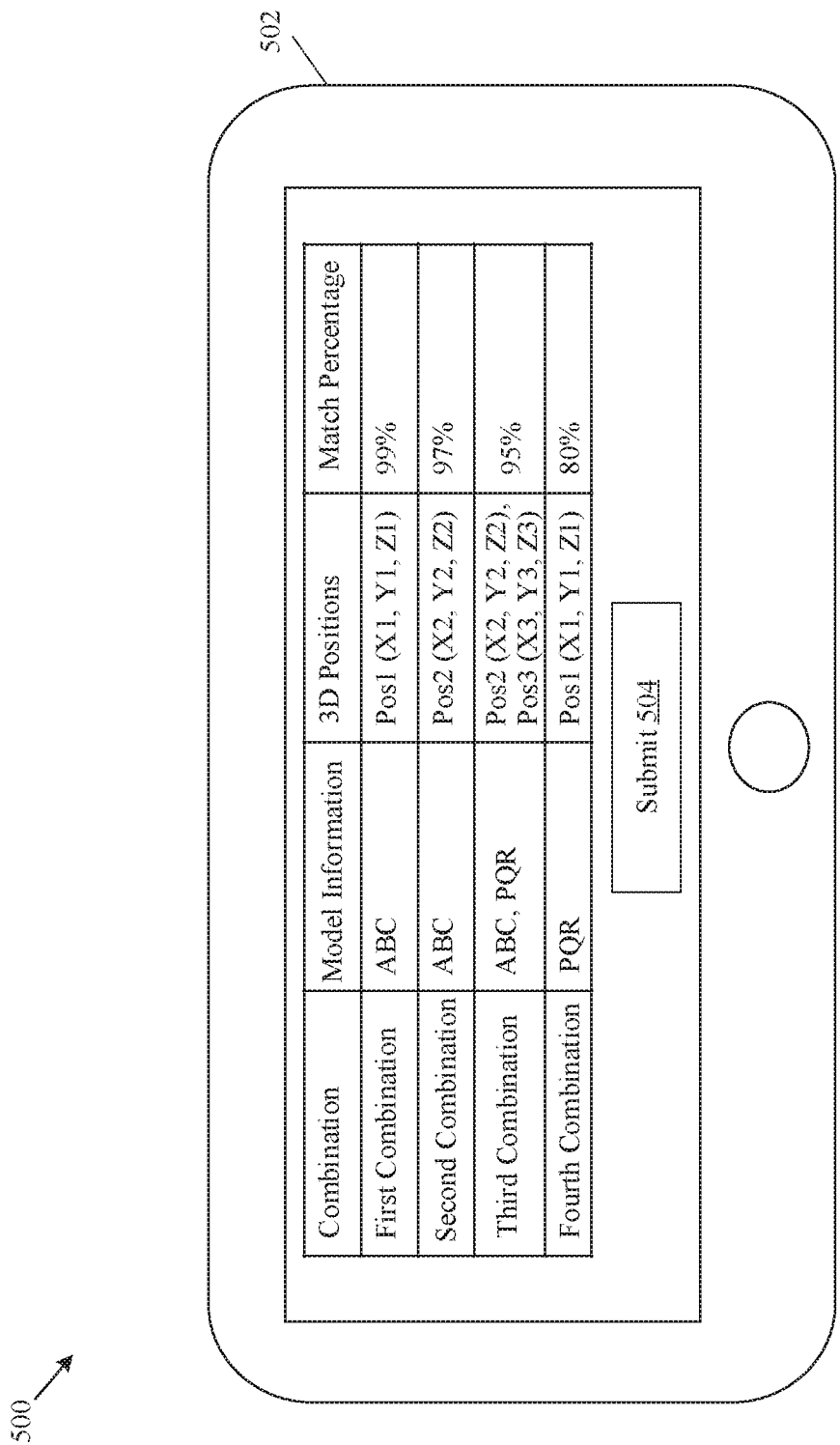
FIG. 5 is a diagram that illustrates exemplary user interface (UI) that may display output information associated with audio reproduction virtualization, in accordance with an embodiment of the disclosure.

FIG. 5 is a diagram that illustrates exemplary user interface (UI) that may display output information associated with audio reproduction virtualization, in accordance with an embodiment of the disclosure. FIG. 5 is explained in conjunction with elements from FIGS. 1, 2, 3A, 3B, 3C, 3D, 4A, and 4B. With reference to FIG. 5, there is shown a UI 500. The UI 500 may display the generated output information associated with the plurality of combinations on a display screen 502 (such as, the display screen 210). The electronic apparatus 404 may control the display screen 502 to display the output information generated for the plurality of combinations. The circuitry 202 may be configured to control the display screen 502 to display UI 500 in a table form as shown, for example, in FIG. 5. For example, as shown in FIG. 5, the UI 500 may display information about the plurality of combinations (such as, a 'First combination', a 'Second Combination', a 'Third combination', and a 'Fourth combination'). Further, the UI 500 may display model information of one or more audio reproduction devices (such as, the model 'ABC', and 'PQR') corresponding to each combination of the plurality of combinations The UI 500 may further display one or more 3D positions of the one or more audio reproduction devices (such as, a Pos1 (X1, Y1, Z1), a Pos2 (X2, Y2, Z2), and a Pos3 (X3, Y3, Z3)) corresponding to each combination of the plurality of combinations. Further, the UI 500 may display information about a percentage of match between the generated second frequency response with the first target frequency response (such as, 99%, 97%, 98%, and 80%, as shown in FIG. 5) for each of the plurality of combinations. It may be noted that information shown in the UI 500 in FIG. 5 is presented merely as an example and should not be construed to limit the scope of the disclosure. In some embodiments, the circuitry 202 may be configured to display information about the plurality of operational modes (i.e. applied to generate the second frequency responses) associated with the one or more first audio reproduction devices (e.g., the one or more first audio reproduction devices 122) in the UI 500.

In some embodiments, the circuitry 202 may be configured to display information about a set of combinations of the plurality of combinations. The set of combinations may be combinations (i.e. out of the plurality of combinations) which may be applied on the 3D model of the room 402 and on the first frequency response for the generation of the second frequency responses. For example, the electronic apparatus 404 may not apply all the plurality of combinations, but only apply the set of combinations. In another embodiment, the displayed information about the set of combinations may include only those combinations out of the plurality of combinations, for which the generated second frequency response matches with the first target frequency response till a particular threshold (for example at least eighty percent match). For example, the plurality of combinations for which the second frequency response matches with eighty percent of the first target frequency response may be included in the set of combinations, for which the information is displayed in FIG. 5 for the user 108 (or the listener 414), rather than display of all the plurality of combinations applied on the 3D model and the first frequency response for the room 402 for the generation of the second frequency response. In another embodiment, for the selection of the set of combinations from the plurality of combinations, the electronic apparatus 404 may consider a market cost related to different models (i.e. model information) of the one or more audio reproduction devices (shown in FIG. 3B-4A). For example, the electronic apparatus 404 may receive user input from the listener 414 (or the user 108) about a cost threshold (or approved budget range for the audio reproduction device to be selected in the set of combination. Therefore, even if the second frequency response for a particular audio reproduction device matches with the first target frequency response, but the market cost of the model of the particular audio reproduction device is not within the cost threshold stored in the memory 204, the electronic apparatus 404 may not include the output information about the set of combinations displayed on the UI 500.

In FIG. 5, there is further shown UI element (such as a submit button 504). In an embodiment, the circuitry 202 may be configured to receive a user input through the UI 500 and the submit button 504. In an embodiment, the user input may be indicative of a selection of particular combination (such as the first combination) from the displayed information about the set of combinations, through the UI 500. Based on the received user input, the circuitry 202 may select the first combination from the set of combinations.

In an embodiment, the circuitry 202 may be configured to display the information about the set of combinations of the plurality of combinations, through the UI 500. The information about the set of combinations may include, but is not limited to, the model information and 3D positions of the one or more first audio reproduction devices 122, and a percentage of match between the generated second frequency response with the first target frequency response for each of the set of combinations on the display screen 502. In some embodiments, the set of combination displayed on the UI 500 may include the market cost (not shown) related to the models of the one or more first audio reproduction devices 122 indicated in the set of combination. Based on the displayed information about the set of combinations, the circuitry 202 may be configured to receive a user input indicative of a selection of the first combination, through the UI 500. The circuitry 202 may be configured to select the first combination based on the received user input from the listener 414 (i.e. provided based on the selection of one of listed rows and the submit button 504 on the UI 500). The selected first combination may have provided the best and optimal audio experience to the listener 414 (as well as selected audio reproduction devices are within the cost budget), before the actual purchase of the selected one or more first audio reproduction devices, deployment of the purchased audio reproduction device at the corresponding 3D positions in the room 402, and setting the selected audio reproduction devices to the corresponding operational modes, as indicated in the information about the selected first combination.

In accordance with an embodiment, based on the selection of the first combination for the room 402, the electronic apparatus 404 may also suggest the listener 414 to place new objects (of a particular surface material) in the room 402, such that the newly placed objects may not significant affect the second frequency response for the selected first combination. The electronic apparatus 404 may receive the user inputs from the listener 414, where the user inputs may indicate the dimension of the new objects (such as, but not limited to, furniture, decorative items, books, and the like), the surface material of the new objects, and their 3D positions in the 3D model generated for the room 402. Based on the received user inputs, the electronic apparatus 404 may suggest the listener 414 (via the display screen 210) to place the new objects at a particular position, such that the audio experience provided virtually by the selection first combination may not change significantly. In some embodiments, the electronic apparatus 404 may also suggest to re-position existing objects to include the new objects in the room 402.

Figure 6:
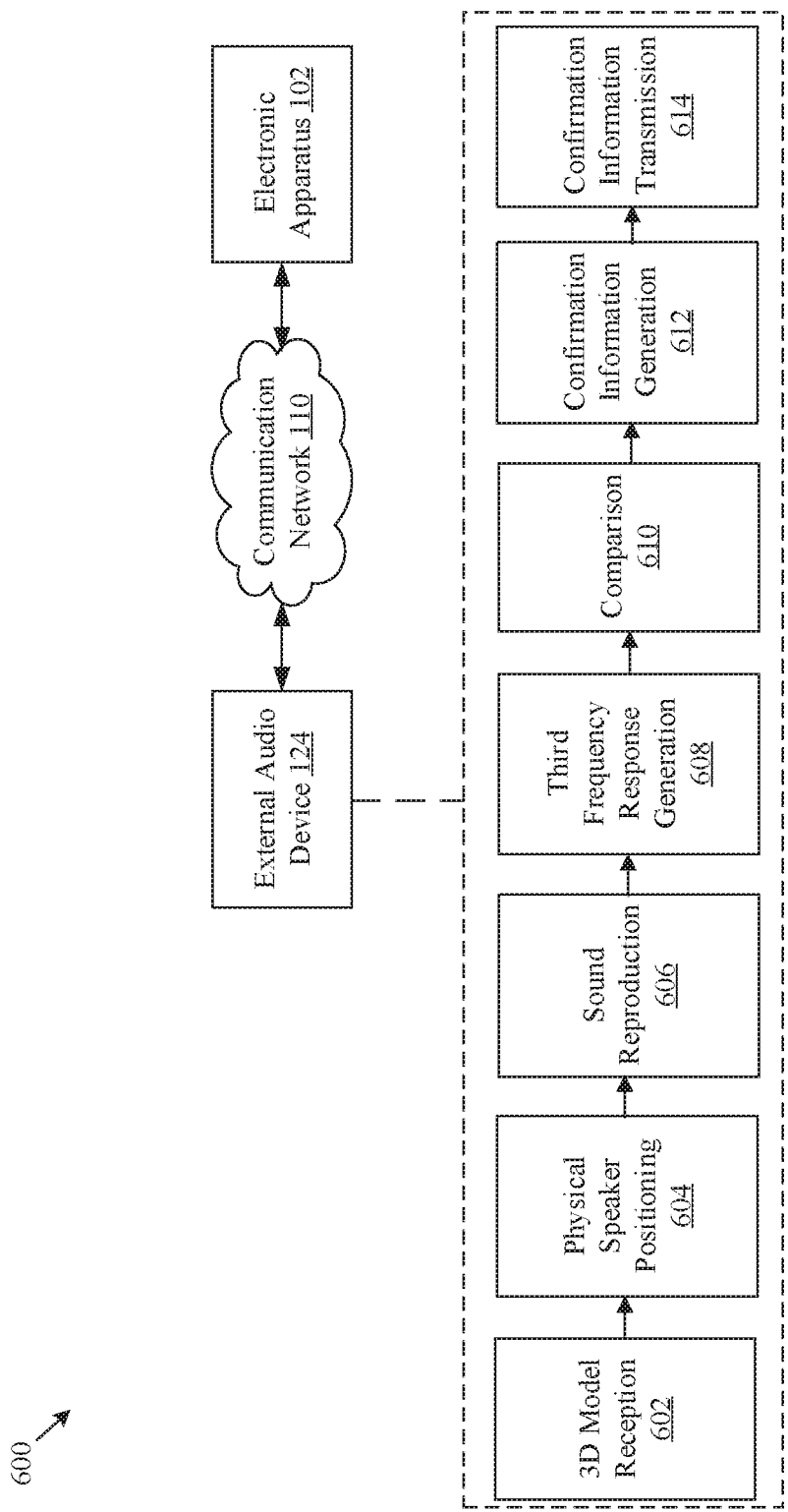
FIG. 6 is a diagram that illustrates exemplary operations that may be performed by an external audio device to confirm a second frequency response for audio reproduction virtualization, in accordance with an embodiment of the disclosure.

FIG. 6 is a diagram that illustrates exemplary operations that may be performed by an external audio device to confirm a second frequency response for audio reproduction virtualization, in accordance with an embodiment of the disclosure. FIG. 6 is explained in conjunction with elements from FIGS. 1, 2, 3A, 3B, 3C, 3D, 4A, 4B, and 5. With reference to FIG. 6, there is shown a block diagram 600 that illustrates exemplary operations 602 to 614, as described herein. The exemplary operations illustrated in the block diagram 600 may start at 602 and may be performed by any computing system, apparatus, or device, such as, by the external audio device 124 of FIG. 1 or FIG. 2. As shown in FIG. 1, the external audio device 124 and the one or more physical audio reproduction devices 126, may be located within the second enclosed physical space 106. The second enclosed physical space 106 may be a three-dimensional physical area that may be different from the first enclosed physical space 104. The second enclosed physical space 106 may correspond to a physical environment that may include the one or more physical audio reproduction devices 126 to provide a real audio experience to the user 108. Examples of the second enclosed physical space 106 may include, but are not limited to, an electronics devices shop, an audio center, or other enclosed areas where the physical audio reproduction devices 126 may be present for purchase or to experience real audio output. Although illustrated with discrete blocks, the exemplary operations associated with one or more blocks of the block diagram 600 may be divided into additional blocks, combined into fewer blocks, or eliminated, depending on implementation of the exemplary operations.

At 602, a generated 3D model may be received. In one or more embodiments, the external audio device 124 may be configured to receive the generated 3D model of an enclosed physical space (such as, the first enclosed physical space 104), the one or more acoustic parameters of the plurality of objects 120, and the output information associated with the selected first combination. In some embodiments, the circuitry 202 of the electronic apparatus 102 may be configured to transmit information about the generated 3D model of the first enclosed physical space 104, the one or more acoustic parameters of the plurality of objects 120, dimensions of the first enclosed physical space 104, the first frequency response (i.e. impulse response) for the first enclosed physical space 104, the output information associated with the selected first combination, and the generated second frequency response for the selected first combination, to the external audio device 124 different from the electronic apparatus 102.

At 604, one or more physical audio reproduction devices (such as, the one or more physical audio reproduction devices 126) may be positioned. In one or more embodiments, the one or more physical audio reproduction devices 126 may be positioned in the second enclosed physical space 106 based on the received output information associated with the selected first combination. Herein, the one or more physical audio reproduction devices 126 may be similar to the or more first audio reproduction devices 122 indicated by the output information, and the positions of the one or more physical audio reproduction devices 126 may be similar to one or more selected 3D positions of the one or more audio reproduction devices 122 indicated by the output information. This may allow to generate a real audio environment in the second enclosed physical space 106 based on the output information received from the electronic apparatus 102. Further, the external audio device 124 may control the one or more physical audio reproduction devices 126 to get configured based on information about the operational modes (i.e. volume setting, equalization setting, or like) of the selected one or more first audio reproduction devices 122 indicated in the output information.

At 606, a sound may be reproduced. In one or more embodiments, the external audio device 124 may control the one or more physical audio reproduction devices 126 to reproduce a third sound in the second enclosed physical space 106, based on the received 3D model of the first enclosed physical space 104, the one or more acoustic parameters of the plurality of objects 120, the output information associated with the selected first combination, and other information described at 602. The one or more physical audio reproduction devices 126 may reproduce the third sound in the second enclosed physical space 106 based on the configured operational modes as indicated in the received output information. The third sound may correspond to an actual sound output that may be heard by a user (such as, the user 108) or another operator present in the second enclosed physical space 106.

At 608, a third frequency response may be generated. In one or more embodiments, the external audio device 124 may control a second audio capturing device (not shown), which may be associated with the external audio device 124, to generate the third frequency response for the third sound (i.e. real sound) reproduced by the one or more physical audio reproduction devices 126 in the second enclosed physical space 106. The second audio capturing device may be similar to the audio capturing device 112. In an embodiment, the third frequency response may be similar to the first frequency response which may be generated for the first sound present in the first enclosed physical space 104, as described, for example, in FIGS. 3A-3B. The external audio device 124 may further apply the received information about the 3D model of the first enclosed physical space 104 (including the information about the dimensions of the first enclosed physical space 104 and the one or more acoustic parameters of the plurality of objects 120) to the generated third frequency response. The external audio device 124 may further update the third frequency response based on the application. The updated third frequency response may indicate an impulse response for the first enclosed physical space 104 (i.e. room 302) for the real reproduction of the third sound by the one or more physical audio reproduction devices 126 which may be physically positioned in the second enclosed physical space 106 (as well as configured) based on the received output information (i.e. described, for example, at 602). In some embodiments, before the application, the external audio device 124 may update the received 3D model of the first enclosed physical space 104 based on the dimensions of the second enclosed physical space 106 and one or more acoustic parameters of objects present in the second enclosed physical space 106. The external audio device 124 may only update the 3D model, in case the dimensions and the objects in the second enclosed physical space 106 are different from the information received from the electronic apparatus 102 about the 3D model of the first enclosed physical space 104.

At 610, the generated third frequency response may be compared. In one or more embodiments, the external audio device 124 may compare the generated third frequency response with the second frequency response generated for the first combination. The second frequency response for the first combination may be received from the electronic apparatus 102 as described, for example, at 602. Based on the comparison, the external audio device 124 may determine a percentage of match between the generated third frequency response with the second frequency response generated for the first combination. This may allow a comparison between a real audio experience associated with the one or more physical audio reproduction devices 126 in the second enclosed physical space 106 with a virtual audio experience associated with the one or more first audio reproduction devices 122 virtually present in the first enclosed physical space 104.

At 612, confirmation information may be generated. In one or more embodiments, the external audio device 124 may generate the confirmation information based on the comparison between the generated third frequency response and the second frequency response generated for the first combination. In an embodiment, the confirmation information generated by the external audio device 124 may include information about the percentage of match between the generated third frequency response with the received second frequency response (for example ninety percent match).

At 614, the confirmation information may be transmitted. In one or more embodiments, the external audio device 124 may transmit the generated confirmation information to the electronic apparatus 102. In an embodiment, the circuitry 202 of the electronic apparatus 102 may be configured to receive the confirmation information to indicate correct or appropriate selection of the first combination (i.e. from the plurality of combinations) to the listener 414, before the actual purchase of audio reproduction devices indicated in the output information. In an embodiment, the circuitry 202 may be configured to control the display screen 210 to display the received confirmation information (including the percentage of match identified at the second enclosed physical space 106, i.e. electronics device shop) with the output information associated with the selected first combination. The display of the confirmation information may provide the user 108 with an assurance that the selected first combination may produce a desirable audio experience for the user 108 in the first enclosed physical space 104 and the user 108 may proceed with the actual purchase of the audio reproduction devices and further position and configure the audio reproduction devices, as per the 3D positions and operational modes indicated in the output information.

The reproduction of the third sound by the one or more physical audio reproduction devices 126 in the second enclosed physical space 106 may provide the user 108 (i.e. physically present in the second enclosed physical space 106) with an audio experience, which may be a realistic approximation of a sound output that may be generated by a same or similar audio reproduction devices when operated in the same operational mode and placed at similar 3D locations in the second enclosed physical space, as indicated in the output information. In a scenario where the external audio device 124 may be used in a speaker showroom or sales/support center, the external audio device 124 may enable the user 108 to take an informed decision to purchase an appropriate audio reproduction device based on the 3D model of the enclosed physical space 104 of the user 108 and desired operational modes for the selected audio reproduction device (i.e. indicted in the output information). For example, the external audio device 124 may receive the information about the selected first combination (or the set of combinations) of operational modes and 3D positions of one or more audio reproduction devices, which may be selected by the user 108, as described, for example, in FIG. 5. The external audio device 124 may control the one or more physical audio reproduction devices 126 to generate the third sound for the first combination (or for each combination in the set of combinations) for the different audio reproduction devices. Based on the third sound for each combination, the speaker showroom or sales/support center may offer the user 108 a tradeoff between speaker cost and desirability (based on speaker quality and sound output).

In addition, the showroom or sales/support center may receive information associated with 3D models of enclosed spaces of users, preferred audio reproduction device of users, and selected combinations of operational modes and 3D positions of audio reproduction devices. Such received information may be used as market research information by the showroom or sales/support center and/or speaker manufacturer companies. The showroom or sales/support center may use such market research information for sales, promotions, pricing, placement, and stocking of speakers and their accessories. Further, the speaker manufacturer may use such market research information to enhance the speaker's performances to the expectations and preferences of customers and thereby increase their revenues.

Figure 7A:
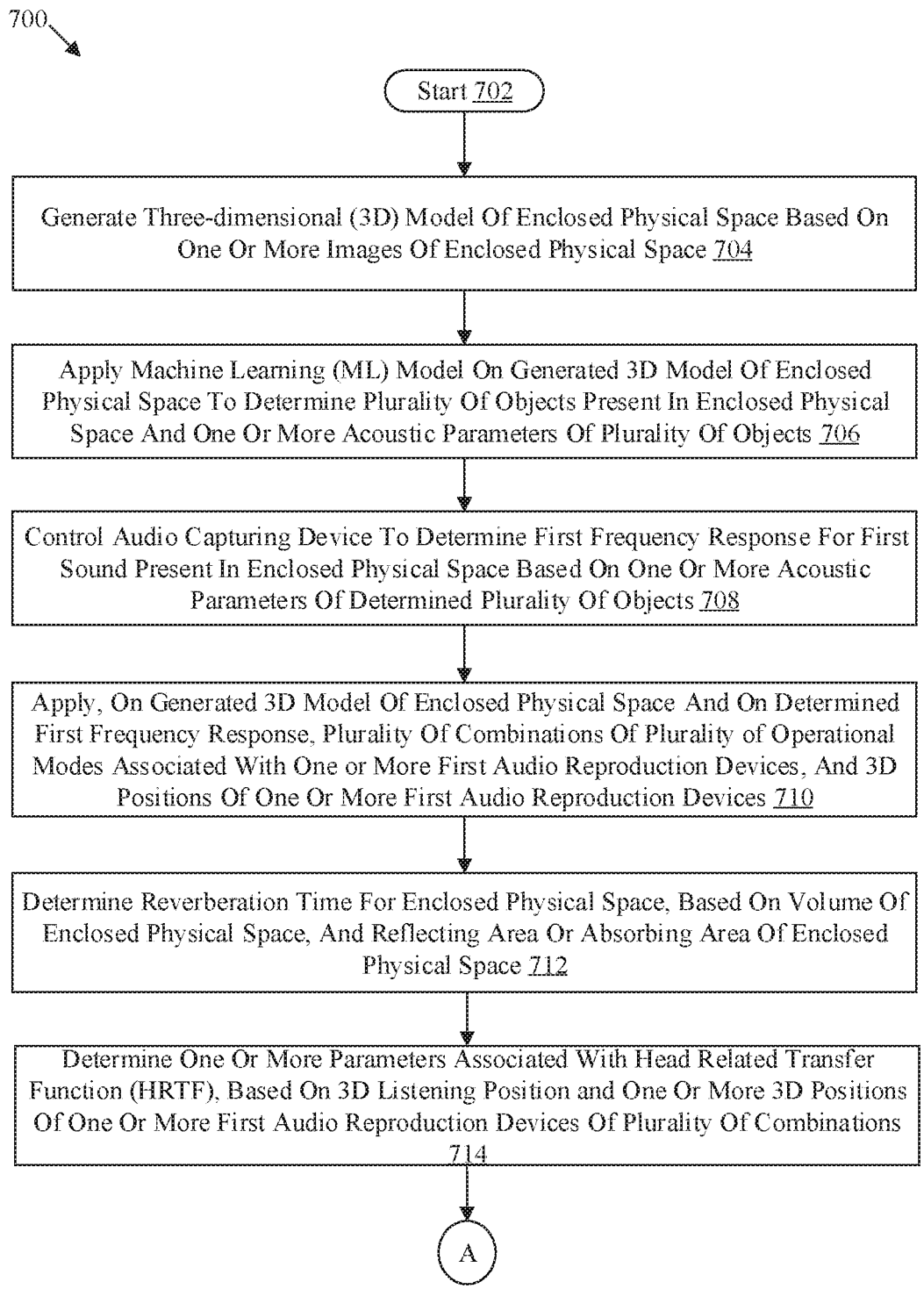
FIGS. 7A and 7B collectively depict a flowchart that illustrates an exemplary method for audio reproduction virtualization in an enclosed physical space, in accordance with an embodiment of the disclosure.
Figure 7B:
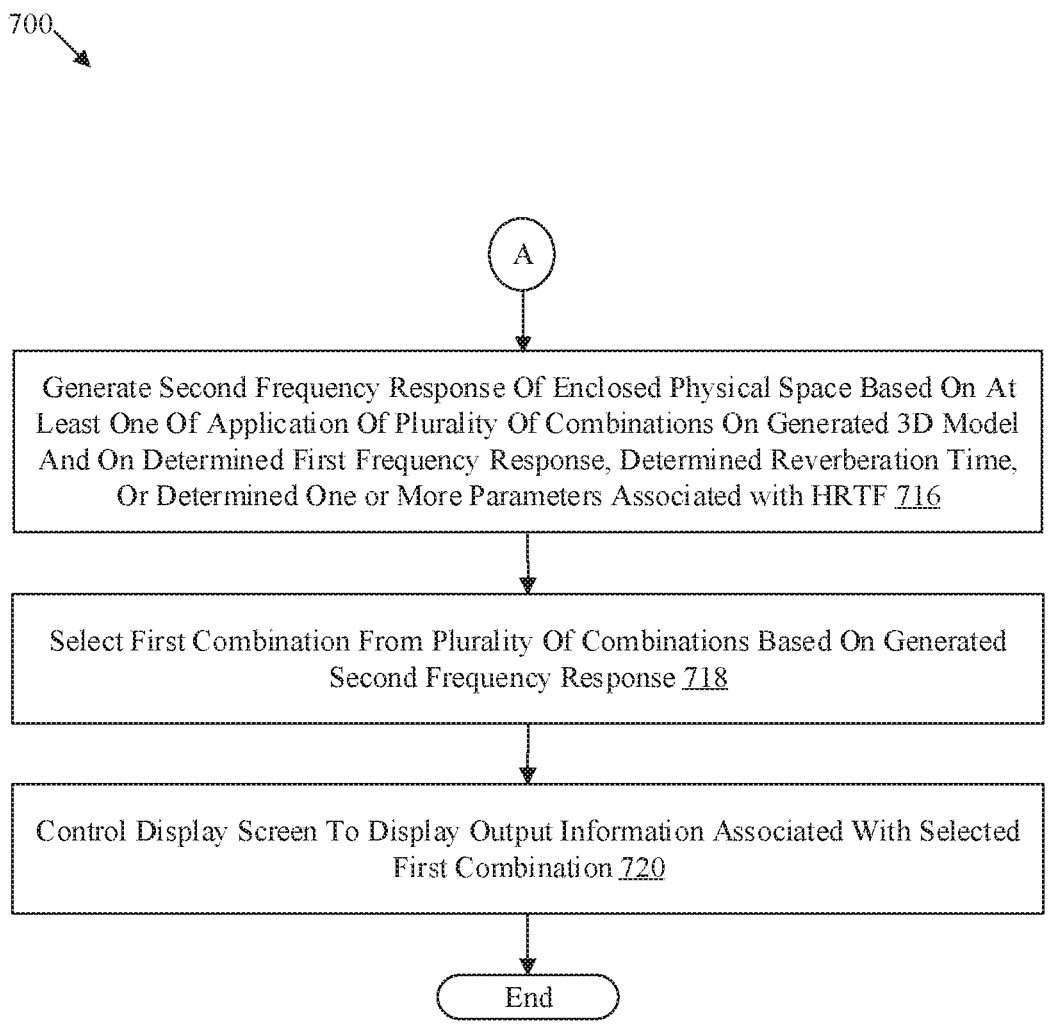

FIG. 7 depicts a flowchart that illustrates an exemplary method for audio reproduction virtualization in an enclosed physical space, in accordance with an embodiment of the disclosure. FIG. 7 are explained in conjunction with elements from FIGS. 1, 2, 3A, 3B, 3C, 3D, 4A, 4B, 5, and 6. With reference to FIG. 7, there is shown a flowchart 700. The operations of the flowchart 700 may be executed by a computing system, such as the electronic apparatus 102, or the circuitry 202. The operations may start at 702 and proceed to 704.

At 704, a three-dimensional (3D) model of an enclosed physical space (such as, the room 302) may be generated based on one or more images of the enclosed physical space (such as, the room 302). In one or more embodiments, the circuitry 202 may be configured to generate the three-dimensional (3D) model of the enclosed physical space (e.g., the room 302) based on the one or more images of the enclosed physical space (e.g., the room 302). The one or more images may include color information and depth information associated with the enclosed physical space (e.g., the room 302). The capture of the one or more images and the determination of the 3D model is described further, for example, in FIG. 3A.

At 706, a machine-learning model (such as the ML model 114) may be applied on the generated 3D model of the enclosed physical space (e.g., the room 302) to determine plurality of objects (e.g., the plurality of objects 120) present in the enclosed physical space (e.g., the room 302) and one or more acoustic parameters of the determined plurality of objects 120. In one or more embodiments, the circuitry 202 may be configured to apply the ML model 114 on the generated 3D model of the enclosed physical space (e.g., the room 302), to determine the plurality of objects (such as, the plurality of objects 120) present in the enclosed physical space (e.g., the room 302) and the one or more acoustic parameters of the plurality of objects 120, as described, for example, in FIG. 3A.

At 708, an audio capturing device (such as the audio capturing device 112) may be controlled to determine a first frequency response for a first sound present in the enclosed physical space. In one or more embodiments, the circuitry 202 may be configured to control the audio capturing device 112 to determine the first frequency response for the first sound present in the enclosed physical space (e.g., the room 302). The determination of the first frequency response may be based on the determined one or more acoustic parameters of the determined plurality of objects 120 present in the enclosed physical space (e.g., the room 302), as described, for example, in FIG. 3A.

At 710, a plurality of combinations of a plurality of operational modes associated with one or more first audio reproduction devices (such as, the one or more first audio reproduction devices 122), and one or more 3D positions of the one or more first audio reproduction devices 122 may be applied on the generated 3D model and the determined first frequency response. In one or more embodiments, the circuitry 202 may be configured to apply, on the generated 3D model of the enclosed physical space (e.g., the room 302) and on the determined first frequency response, the plurality of combinations of the plurality of operational modes, and one or more 3D positions of the one or more first audio reproduction devices 122, as described, for example, in FIGS. 3A-3D.

At 712, a reverberation time may be determined for the enclosed physical space (e.g., the room 302), based on a volume and one of a reflecting area or an absorbing area of the enclosed physical space (e.g., the room 302). In one or more embodiments, the circuitry 202 may be configured to determine the reverberation time for the enclosed physical space, based on the volume of the enclosed physical space (e.g., the room 302), and a reflecting area or an absorbing area of the enclosed physical space (e.g., the room 302). The determination of the reverberation time is described, for example, in FIG. 3D.

At 714, one or more parameters associated with a head related transfer function (HRTF) may be determined, based on a determined 3D listening position and each of the one or more 3D positions of the one or more first audio reproduction devices 122 for the plurality of combinations. In one or more embodiment, the circuitry 202 may be configured to determine the one or more parameters associated with the HRTF, based on the determined 3D listening position and each of the one or more 3D positions of the one or more first audio reproduction devices 122 for the plurality of combinations, as described, for example, in FIG. 4A. The one or more parameters associated with the HRTF may include at least one of: a distance between the determined 3D listening position and each of the one or more 3D positions of the one or more first audio reproduction devices 122, an angle between the determined 3D listening position and each of the one or more 3D positions of the one or more first audio reproduction devices 122, and an elevation angle.

At 716, a second frequency response of the enclosed physical space (e.g., the room 302) may be generated. In one or more embodiments, the circuitry 202 may be configured to generate the second frequency response of the enclosed physical space (e.g., the room 302) based on the application of each of the plurality of combinations on the generated 3D model and on the determined first frequency response, as described, for example, in FIG. 3B. In one or more embodiments, the circuitry 202 may be configured to generate the second frequency response for each of the plurality of combinations based on the determined reverberation time, as described, for example, in FIG. 3D. In one or more embodiments, the circuitry 202 may be configured to generate the second frequency response for each of the plurality of combinations based on the determined one or more parameters associated with the HRTF, as described, for example, in FIG. 4A.

At 718, a first combination may be selected from the plurality of combinations. In one or more embodiments, the circuitry 202 may be configured to select the first combination from the plurality of combinations based on the second frequency response generated for each of the plurality of combinations, as described, for example, in FIGS. 3B-3D.

At 720, a display screen (such as display screen 210) may be controlled to display output information associated with the selected first combination. In one or more embodiments, the circuitry 202 may be configured to control the display screen 210 to display the output information associated with the selected first combination, as described for example, in FIG. 5. Control may pass to end.

Although the flowchart 700 is illustrated as discrete operations, such as 704, 706, 708, 710, 712, 714, 716, 718, and 720, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example, the electronic apparatus 102). The electronic apparatus 102 may include an audio capturing device (e.g., the audio capturing device 112), and a memory (e.g., the memory 204) that may be configured to store a plurality of operational modes associated with one or more first audio reproduction devices (e.g., the one or more first audio reproduction devices 122). The instructions may cause the machine and/or computer (for example, the electronic apparatus 102) to perform operations that may include generation of a three-dimensional (3D) model of an enclosed physical space (e.g., the first enclosed physical space 104) based on one or more images of the enclosed physical space (e.g., the first enclosed physical space 104). The one or more images may include color information and depth information associated with the enclosed physical space (e.g., the first enclosed physical space 104). The operations may further include application of a machine-learning model (e.g., the ML model 114) on the generated 3D model of the enclosed physical space (e.g., the first enclosed physical space 104), to determine a plurality of objects (e.g., the plurality of objects 120) present in the enclosed physical space (e.g., the first enclosed physical space 104) and one or more acoustic parameters of the plurality of objects 120. The operations may further include control of the audio capturing device 112 to determine a first frequency response for a first sound present in the enclosed physical space (e.g., the first enclosed physical space 104) based on the determined one or more acoustic parameters of the determined plurality of objects 120. The operations may further include application, on the generated 3D model and on the determined first frequency response, of a plurality of combinations of the plurality of operational modes and one or more 3D positions of the one or more first audio reproduction devices 122. The operations may further include generation of a second frequency response of the enclosed physical space (e.g., the first enclosed physical space 104) based on the application of each of the plurality of combinations on the generated 3D model and on the determined first frequency response. The operations may further include selection of a first combination from the plurality of combinations based on the second frequency response generated for each of the plurality of combinations. The operations may further include control of a display screen to display of output information associated with the selected first combination.

Exemplary aspects of the disclosure may include an electronic apparatus (such as, the electronic apparatus 102) that may include an audio capturing device (such as, the audio capturing device 112), a memory (such as, the memory 204) and circuitry (such as, the circuitry 202) that may be communicatively coupled to the audio capturing device 112 and the memory 204. The memory 204 may be configured to store a plurality of operational modes associated with one or more first audio reproduction devices (such as, the one or more first audio reproduction devices 122). The circuitry 202 may be configured to generate a three-dimensional (3D) model of an enclosed physical space (such as, the first enclosed physical space 104) based on one or more images of the enclosed physical space (e.g., the first enclosed physical space 104). The one or more images include color information and depth information associated with the enclosed physical space (e.g., the first enclosed physical space 104). The circuitry 202 may be configured to apply a machine-learning model (such as, the ML model 114) on the generated 3D model of the enclosed physical space, to determine a plurality of objects (e.g., the plurality of objects 120) present in the enclosed physical space (e.g., the first enclosed physical space 104) and one or more acoustic parameters of the plurality of objects 120. The circuitry 202 may be configured to control the audio capturing device 112 to determine a first frequency response for a first sound present in the enclosed physical space (e.g., the first enclosed physical space 104) based on the determined one or more acoustic parameters of the determined plurality of objects 120. The circuitry 202 may be configured to apply, on the generated 3D model of the enclosed physical space and on the determined first frequency response, a plurality of combinations of the plurality of operational modes associated with the one or more first audio reproduction devices, and one or more three-dimensional (3D) positions of the one or more first audio reproduction devices. The circuitry 202 may be configured to generate a second frequency response of the enclosed physical space (e.g., the first enclosed physical space 104) based on the application of each of the plurality of combinations on the generated 3D model and on the determined first frequency response. The circuitry 202 may be configured to select a first combination from the plurality of combinations based on the second frequency response generated for each of the plurality of combinations. The circuitry 202 may be configured to control of a display screen (i.e. display screen 210) to display output information associated with the selected first combination.

In an example, each operational mode of the plurality of operational modes may include at least one of, but not limited to, a volume setting, a gain setting, a filter setting, or an equalization setting, associated with the one or more first audio reproduction devices 122. In an example, the plurality of objects 120 may include at least one of, but not limited to, a second audio reproduction device (such as, the second audio reproduction device 116), a display device (such as, the TV 310), one or more furniture items (such as, the sofa 314), one or more decorative items (such as, the window 312), or one or more listeners (such as, the listener 316) present in the enclosed physical space (e.g., the room 302).

In accordance with an embodiment, the one or more first audio reproduction devices 122 may correspond to virtual audio reproduction devices. In an example, the one or more acoustic parameters may include at least one of, but not limited to, an absorption coefficient, a reflection coefficient, a dimension, a volume, or a surface material, associated with each of the determined plurality of objects 120.

In accordance with an embodiment, the circuitry 202 may be further configured to apply the ML model 114 on the generated 3D model of the enclosed physical space (e.g., the first enclosed physical space 104) to determine a surface material, as the one or more acoustic parameters, of each of the determined plurality of objects 120. Based on the determined surface material, the circuitry 202 may be configured to determine a reflection coefficient or an absorption coefficient of each of the plurality of objects 120. The circuitry may be further configured to generate the second frequency response of the enclosed physical space (e.g., the first enclosed physical space 104) for each of the plurality of combinations based on the determined reflection coefficient or the absorption coefficient of each of the plurality of objects 120.

In accordance with an embodiment, the circuitry 202 may be further configured to compare the generated second frequency response of the enclosed physical space (e.g., the first enclosed physical space 104) for each of the plurality of combinations with a first target frequency response of the enclosed physical space (e.g., the first enclosed physical space 104). Based on the comparison, the circuitry 202 may be configured to select the first combination from the plurality of combinations.

In accordance with an embodiment, the circuitry 202 may be further configured to control the display screen 210 to display information about a set of combinations of the plurality of combinations. The information about the set of combinations may include model information of the one or more first audio reproduction devices 122, the one or more 3D positions of the one or more first audio reproduction devices 122, and a percentage of match between the generated second frequency response with the first target frequency response for each of the set of combinations. The circuitry 202 may be configured to receive a user input indicative of a selection of the first combination from the displayed information about the set of combinations. Based on the received user input, the circuitry 202 may be configured to select the first combination.

In accordance with an embodiment, the generated second frequency response for the first combination of the plurality of combinations may be different from the generated second frequency response for a second combination of the plurality of combinations, and the one or more first audio reproduction devices 122 or the one or more 3D positions may be different in the first combination and the second combination.

In accordance with an embodiment, the electronic apparatus 102 may further include a second audio reproduction device (such as, the second audio reproduction device 116). The circuitry 202 may be configured to control the second audio reproduction device 116 to reproduce a second sound based on the second frequency response for each of the plurality of combinations. The circuitry 202 may be configured to receive a user input indicative of a selection of a first combination from the plurality of combinations. The circuitry 202 may be configured to select the first combination based on the reproduced second sound for each of the plurality of combinations and the received user input.

In accordance with an embodiment, the circuitry 202 may be further configured to receive one or more user inputs which indicate model information of the one or more first audio reproduction devices 122, and the one or more 3D positions of the one or more first audio reproduction devices 122 in the enclosed physical space (e.g., the first enclosed physical space 104). The circuitry 202 may be configured to generate the plurality of combinations of the plurality of operational modes associated with the one or more first audio reproduction devices 122, and the one or more 3D positions of the one or more first audio reproduction devices 122 in the enclosed physical space (e.g., the first enclosed physical space 104), based on the received one or more user inputs.

In an example, the output information may include, but is not limited to, model information of one or more selected audio reproduction devices, one or more selected 3D positions of the one or more selected audio reproduction devices, and one or more operational modes of the one or more selected audio reproduction devices.

In accordance with an embodiment, the circuitry 202 may be further configured to determine a reverberation time for the enclosed physical space (e.g., the first enclosed physical space 104), based on a volume of the enclosed physical space (e.g., the first enclosed physical space 104), and a reflecting area or an absorbing area of the enclosed physical space (e.g., the first enclosed physical space 104). The circuitry 202 may be configured to generate the second frequency response for each of the plurality of combinations based on the determined reverberation time. In an example, the reflecting area or the absorbing area may be based on the one or more acoustic parameters of the plurality of objects 120.

In accordance with an embodiment, the circuitry 202 may be further configured to determine a 3D listening position present in the enclosed physical space (e.g., the first enclosed physical space 104). The circuitry 202 may be configured to determine one or more parameters associated with a head related transfer function (HRTF), based on the determined 3D listening position and each of the one or more 3D positions of the one or more first audio reproduction devices 122 for the plurality of combinations. The circuitry 202 may be configured to generate the second frequency response for each of the plurality of combinations based on the determined one or more parameters associated with the HRTF. In an example, the one or more parameters associated with the HRTF may include at least one of, but are not limited to, a distance (such as the distance 'D') between the determined 3D listening position and each of the one or more 3D positions of the one or more first audio reproduction devices, an angle (such as the angle 'a') between the determined 3D listening position and each of the one or more 3D positions of the one or more first audio reproduction devices, and an elevation angle.

In accordance with an embodiment, the circuitry 202 may be further configured to determine a 3D listening position present in the enclosed physical space (e.g., the first enclosed physical space 104). The circuitry 202 may be configured to determine a distance (such as the distance 'D')

between the determined 3D listening position and each of the one or more 3D positions of the one or more first audio reproduction devices 122, and an angle (such as the angle 'α') between the determined 3D listening position and each of the one or more 3D positions of the one or more first audio reproduction devices 122. The circuitry 202 may be configured to generate the second frequency response for each of the plurality of combinations based on the determined distance and the determined angle.

In accordance with an embodiment, the circuitry 202 may be further configured to receive a user input which may indicate one or more dimensions of the enclosed physical space (e.g., the first enclosed physical space 104). Based on the received user input, the circuitry 202 may be configured to generate the second frequency response for each of the plurality of combinations.

In accordance with an embodiment, the circuitry 202 may be further configured to transmit the generated 3D model of the enclosed physical space (e.g., the first enclosed physical space 104), the one or more acoustic parameters of the plurality of objects 120, and the output information associated with the selected first combination, to an external audio device (such as, the external audio device 124) different from the electronic apparatus 102. The circuitry 202 may be configured to receive confirmation information, about the selection of the first combination from the plurality of combinations, from the external audio device 124. The circuitry 202 may be configured to control the display screen 210 to display the received confirmation information with the output information associated with the selected first combination.

In accordance with an embodiment, the external audio device 124 may receive the generated 3D model of the enclosed physical space (e.g., the first enclosed physical space 104), the one or more acoustic parameters of the plurality of objects 120, and the output information associated with the selected first combination. The external audio device 124 may control one or more physical audio reproduction devices (such as, the one or more physical audio reproduction devices 126), similar to the one or more first audio reproduction devices 122 indicated by the output information, to reproduce a third sound. The third sound may be reproduced based on the received output information associated with the selected first combination. The external audio device 124 may control a second audio capturing device, associated with the external audio device 124, to generate a third frequency response for the third sound based on the received 3D model of the enclosed physical space and the one or more acoustic parameters of the plurality of objects. The external audio device 124 may compare the generated third frequency response with the second frequency response generated for the first combination. The external audio device 124 may generate the confirmation information based on the comparison between the generated third frequency response and the second frequency response generated for the first combination. The external audio device 124 may transmit the generated confirmation information to the electronic apparatus 102.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
   an audio capturing device;
   a memory configured to store a plurality of operational modes associated with one or more first audio reproduction devices; and
   circuitry coupled with the audio capturing device and the memory, wherein the circuitry is configured to:
      generate a three-dimensional (3D) model of an enclosed physical space based on one or more images of the enclosed physical space, wherein the one or more images include color information and depth information associated with the enclosed physical space;
      apply a machine-learning model on the generated 3D model of the enclosed physical space, to determine a plurality of objects present in the enclosed physical space and one or more acoustic parameters of the plurality of objects;
      control the audio capturing device to determine a first frequency response for a first sound present in the enclosed physical space based on the determined one or more acoustic parameters of the determined plurality of objects present in the enclosed physical space;
      apply, on the generated 3D model of the enclosed physical space and on the determined first frequency response, a plurality of combinations of the plurality of operational modes associated with the one or more first audio reproduction devices, and one or more three-dimensional (3D) positions of the one or more first audio reproduction devices;
      generate a second frequency response of the enclosed physical space based on the application of each of the plurality of combinations on the generated 3D model and on the determined first frequency response;

select a first combination from the plurality of combinations based on the second frequency response generated for each of the plurality of combinations; and control a display screen to display output information associated with the selected first combination.

2. The electronic apparatus according to claim 1, wherein each operational mode of the plurality of operational modes indicates at least one of a volume setting, a gain setting, a filter setting, or an equalization setting, associated with the one or more first audio reproduction devices.

3. The electronic apparatus according to claim 1, wherein the plurality of objects comprises at least one of a second audio reproduction device, a display device, one or more furniture items, one or more decorative items, or one or more listeners present in the enclosed physical space.

4. The electronic apparatus according to claim 1, wherein the one or more first audio reproduction devices are virtual audio reproduction devices.

5. The electronic apparatus according to claim 1, wherein the one or more acoustic parameters include at least one of an absorption coefficient, a reflection coefficient, a dimension, a volume, or a surface material, associated with each of the determined plurality of objects.

6. The electronic apparatus according to claim 1, wherein the circuitry is further configured to:
apply the machine-learning model on the generated 3D model of the enclosed physical space to determine a surface material, as the one or more acoustic parameters, of each of the determined plurality of objects;
determine a reflection coefficient or an absorption coefficient of each of the plurality of objects based on the determined surface material; and
generate the second frequency response of the enclosed physical space for each of the plurality of combinations based on the determined reflection coefficient or the absorption coefficient of each of the plurality of objects.

7. The electronic apparatus according to claim 1, wherein the circuitry is further configured to:
compare the generated second frequency response of the enclosed physical space for each of the plurality of combinations with a first target frequency response of the enclosed physical space; and
select the first combination from the plurality of combinations based on the comparison.

8. The electronic apparatus according to claim 7, wherein the circuitry is further configured to:
control the display screen to display information about a set of combinations of the plurality of combinations, wherein the display information about the set of combinations comprise model information of the one or more first audio reproduction devices, the one or more 3D positions of the one or more first audio reproduction devices, and a percentage of match between the generated second frequency response with the first target frequency response for each of the set of combinations;
receive a user input indicative of a selection of the first combination from the displayed information about the set of combinations; and
select the first combination based on the received user input.

9. The electronic apparatus according to claim 1,
wherein the generated second frequency response for the first combination of the plurality of combinations is different from the generated second frequency response for a second combination of the plurality of combinations; and wherein the one or more first audio reproduction devices or the one or more 3D positions are different in the first combination and the second combination.

10. The electronic apparatus according to claim 1, further comprising a second audio reproduction device, wherein the circuitry is further configured to:
control the second audio reproduction device to reproduce a second sound based on the second frequency response for each of the plurality of combinations;
receive a user input indicative of a selection of the first combination from the plurality of combinations; and
select the first combination based on the reproduced second sound for each of the plurality of combinations and the received user input.

11. The electronic apparatus according to claim 1, wherein the circuitry is further configured to:
receive one or more user inputs which indicate model information of the one or more first audio reproduction devices, and the one or more 3D positions of the one or more first audio reproduction devices in the enclosed physical space; and
generate the plurality of combinations of the plurality of operational modes associated with the one or more first audio reproduction devices, and the one or more 3D positions of the one or more first audio reproduction devices in the enclosed physical space, based on the received one or more user inputs.

12. The electronic apparatus according to claim 1, wherein the output information comprises model information of one or more selected audio reproduction devices, one or more selected 3D positions of the one or more selected audio reproduction devices, and one or more operational modes of the one or more selected audio reproduction devices.

13. The electronic apparatus according to claim 1, wherein the circuitry is further configured to:
determine a reverberation time for the enclosed physical space, based on a volume of the enclosed physical space, and a reflecting area or an absorbing area of the enclosed physical space; and
generate the second frequency response for each of the plurality of combinations based on the determined reverberation time.

14. The electronic apparatus according to claim 13, wherein the reflecting area or the absorbing area is based on the one or more acoustic parameters of the plurality of objects.

15. The electronic apparatus according to claim 1, wherein the circuitry is further configured to:
determine a 3D listening position present in the enclosed physical space;
determine one or more parameters associated with a head related transfer function (HRTF), based on the determined 3D listening position and each of the one or more 3D positions of the one or more first audio reproduction devices for the plurality of combinations; and
generate the second frequency response for each of the plurality of combinations based on the determined one or more parameters associated with the HRTF.

16. The electronic apparatus according to claim 15, wherein the one or more parameters associated with the HRTF comprise at least one of a distance between the determined 3D listening position and each of the one or more 3D positions of the one or more first audio reproduction devices, an angle between the determined 3D listening position and each of the one or more 3D positions of the one or more first audio reproduction devices, or an elevation angle.

17. The electronic apparatus according to claim 1, wherein the circuitry is further configured to:
    determine a 3D listening position present in the enclosed physical space;
    determine a distance between the determined 3D listening position and each of the one or more 3D positions of the one or more first audio reproduction devices, and an angle between the determined 3D listening position and each of the one or more 3D positions of the one or more first audio reproduction devices; and
    generate the second frequency response for each of the plurality of combinations based on the determined distance and the determined angle.

18. The electronic apparatus according to claim 1, wherein the circuitry is further configured to:
    receive a user input which indicates one or more dimensions of the enclosed physical space; and
    generate the second frequency response for each of the plurality of combinations based on the received user input.

19. The electronic apparatus according to claim 1, wherein the circuitry is further configured to:
    transmit the generated 3D model of the enclosed physical space, the one or more acoustic parameters of the plurality of objects, and the output information associated with the selected first combination, to an external audio device different from the electronic apparatus;
    receive confirmation information, about the selection of the first combination from the plurality of combinations, from the external audio device; and
    control the display screen to display the received confirmation information with the output information associated with the selected first combination.

20. The electronic apparatus according to claim 19, wherein the external audio device:
    receives the generated 3D model of the enclosed physical space, the one or more acoustic parameters of the plurality of objects, and the output information associated with the selected first combination;
    controls one or more physical audio reproduction devices, similar to the one or more first audio reproduction devices indicated by the output information, to reproduce a third sound based on the received output information associated with the selected first combination;
    controls a second audio capturing device, associated with the external audio device, to generate a third frequency response for the third sound, based on the received 3D model of the enclosed physical space and the one or more acoustic parameters of the plurality of objects;
    compares the generated third frequency response with the second frequency response generated for the first combination;
    generates the confirmation information based on the comparison between the generated third frequency response and the second frequency response generated for the first combination; and
    transmits the generated confirmation information to the electronic apparatus.

21. A method, comprising:
    in an electronic apparatus which includes an audio capturing device:
        storing a plurality of operational modes associated with one or more first audio reproduction devices;
        generating a three-dimensional (3D) model of an enclosed physical space based on one or more images of the enclosed physical space, wherein the one or more images include color information and depth information associated with the enclosed physical space;
        applying a machine-learning model on the generated 3D model of the enclosed physical space, to determine a plurality of objects present in the enclosed physical space and one or more acoustic parameters of the plurality of objects;
        controlling the audio capturing device to determine a first frequency response for a first sound present in the enclosed physical space based on the determined one or more acoustic parameters of the determined plurality of objects present in the enclosed physical space;
        applying, on the generated 3D model of the enclosed physical space and on the determined first frequency response, a plurality of combinations of the plurality of operational modes associated with the one or more first audio reproduction devices, and one or more three-dimensional (3D) positions of the one or more first audio reproduction devices;
        generating a second frequency response of the enclosed physical space based on the application of each of the plurality of combinations on the generated 3D model and on the determined first frequency response;
        selecting a first combination from the plurality of combinations based on the second frequency response generated for each of the plurality of combinations; and
        controlling a display screen to display output information associated with the selected first combination.

22. A non-transitory computer-readable medium having stored thereon, computer-executable instructions that when executed by an electronic apparatus, causes the electronic apparatus to execute operations, the operations comprising:
    storing a plurality of operational modes associated with one or more first audio reproduction devices;
    generating a three-dimensional (3D) model of an enclosed physical space based on one or more images of the enclosed physical space, wherein the one or more images include color information and depth information associated with the enclosed physical space;
    applying a machine-learning model on the generated 3D model of the enclosed physical space, to determine a plurality of objects present in the enclosed physical space and one or more acoustic parameters of the plurality of objects;
    controlling an audio capturing device associated with the electronic apparatus, to determine a first frequency response for a first sound present in the enclosed physical space based on the determined one or more acoustic parameters of the determined plurality of objects present in the enclosed physical space;
    applying, on the generated 3D model of the enclosed physical space and on the determined first frequency response, a plurality of combinations of the plurality of operational modes associated with the one or more first audio reproduction devices, and one or more three-dimensional (3D) positions of the one or more first audio reproduction devices;
    generating a second frequency response of the enclosed physical space based on the application of each of the plurality of combinations on the generated 3D model and on the determined first frequency response;
selecting a first combination from the plurality of combinations based on the second frequency response generated for each of the plurality of combinations; and
controlling a display screen to display output information associated with the selected first combination.

* * * * *